(12) United States Patent
Harcey et al.

(10) Patent No.: US 11,487,420 B2
(45) Date of Patent: Nov. 1, 2022

(54) METHODS, APPARATUS, AND ARTICLES OF MANUFACTURE TO DISPLAY DATA IN COMPACT SPACES

(71) Applicant: Deere & Company, Moline, IL (US)

(72) Inventors: Jon Harcey, Waukee, IA (US); Mitchell Callahan, West Des Moines, IA (US); Erich Wassilak, Des Moines, IA (US); Joe Bright, Ankeny, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 17/010,621

(22) Filed: Sep. 2, 2020

(65) Prior Publication Data

US 2022/0066629 A1   Mar. 3, 2022

(51) Int. Cl.
  *G06F 3/0485*   (2022.01)
  *A01D 75/00*   (2006.01)
  *G06F 3/04855*   (2022.01)
  *G06F 3/0483*   (2013.01)

(52) U.S. Cl.
  CPC ........ *G06F 3/04855* (2013.01); *G06F 3/0483* (2013.01); *A01D 75/00* (2013.01); *G06F 3/0485* (2013.01)

(58) Field of Classification Search
  CPC .................. G06F 3/0485; G06F 3/04855
  See application file for complete search history.

(56) References Cited

U.S. PATENT DOCUMENTS

| | | | |
|---|---|---|---|
| 2004/0268259 A1* | 12/2004 | Rockey | G06F 3/0482 715/708 |
| 2008/0024444 A1* | 1/2008 | Abe | G06F 3/0485 345/157 |
| 2016/0349936 A1 | 12/2016 | Cho et al. | |

OTHER PUBLICATIONS

Material Design, "Chips," last retrieved Aug. 21, 2020, [online] available at: https://material.io/components/chips#types (81 pages).
Damini Walia, "Designing Search and Filter," UX, UX Design Trends 2018, UI, Lollypop, last retrieved Feb. 2, 2021, [online] available at: https://www.lollypop.design/blog/2019/october/designing-search-and-filter/ (31 pages).
Airbnb, "How do I use search filters?," last retrieved Feb. 2, 2021, [online] available at: https://www.airbnb.com/help/article/479/how-do-i-use-search-filters (5 pages).

(Continued)

*Primary Examiner* — Linda Huynh
(74) *Attorney, Agent, or Firm* — Hanley, Flight & Zimmerman, LLC

(57) ABSTRACT

Methods, apparatus, systems, and articles of manufacture are disclosed to display data in compact spaces. Examples instructions that, when executed, cause a processor to at least render a view container and a scroll container included in a graphics user interface (GUI); in response to a left edge of the scroll container being closer to a left side of the GUI than a left edge of the view container, render a left scroll toggle actionable to scroll the scroll container left; and in response to a right edge of the view container being closer to the left side of the GUI than a right edge of the scroll container, render a right scroll toggle actionable to scroll the scroll container right.

20 Claims, 16 Drawing Sheets

(56) References Cited

OTHER PUBLICATIONS

Youtube, "Advanced search (Filters)," last retrieved Feb. 2, 2021, [online] available at: https://support.google.com/youtube/answer/111997#zippy=%2Ccomputer%2Cmobile-app%2Cmobile-web (2 pages).

Arooj Ahmed, YouTube's Desktop Site Now Has Topics Filters for Recommended Videos, Digital Information World, Dec. 28, 2020, last retrieved Feb. 2, 2021, [online] available at: https://www.digitalinformationworld.com/2020/12/youtubes-desktop-site-now-has-topics.html (6 pages).

Abhay Venkatesh, "YouTube's recommendation topic filter feature rolls out to all Android users," Neowin, Jul. 10, 2019, last retrieved Feb. 2, 2021, [online] available at: https://www.neowin.net/news/youtubes-recommendation-topic-filter-feature-rolls-out-to-all-android-users/ (6 pages).

Shili Li, "Airbnb vs Xiaozhu in China: A Usability Case Study," Medium, May 30, 2018, [online] available at: https://medium.com/@shili.89/airbnb-vs-xiaozhu-in-china-a-usability-case-study-8e05525aceed (21 pages).

María Barrena, "How we transformed the product search for the better," Commercetools Tech, Feb. 11, 2020, [online] available at: https://techblog.commercetools.com/how-we-transformed-the-product-search-for-the-better-7f8ac75dbeba (23 pages).

Louise Vollaire and Alexandra Prokhorova, "Search filters: 5 best practices for a great UX," Algolia Blog, Mar. 27, 2020, [online] available at: https://www.algolia.com/blog/ux/search-filter-ux-best-practices/ (17 pages).

\* cited by examiner

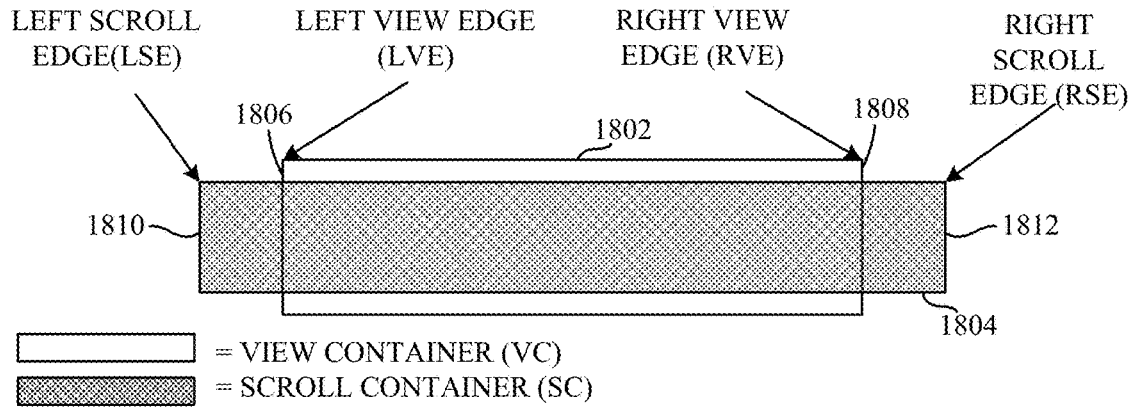
FIG. 18
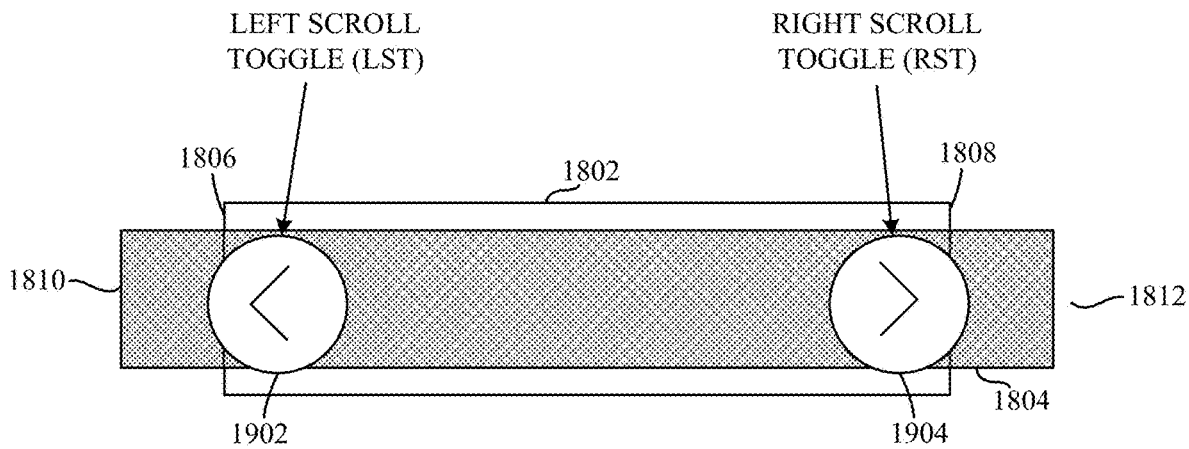
FIG. 19
2002: IF(LSE − LVE) < ZERO, THEN RENDER LST
2004: IF(LSE−LVE) >= ZERO, THEN DO NOT RENDER LST
2006: IF(RVE−RSE) < ZERO, THEN RENDER RST
2008: IF(RVE−RSE) >= ZERO, THEN DO NOT RENDER RST
FIG. 20

METHODS, APPARATUS, AND ARTICLES OF MANUFACTURE TO DISPLAY DATA IN COMPACT SPACES

FIELD OF THE DISCLOSURE

This disclosure relates generally to graphical user interfaces, and, more particularly, to methods, apparatus, and articles of manufacture to display data in compact spaces.

BACKGROUND

As technology and society advance, users of applications (e.g., web-based applications, smart-device applications, etc.) are faced with a daunting number of inputs from which to select. Graphical user interface designers have sought to develop improved mechanisms to engage users. To achieve such engagement, some interface designers utilize chips. As used herein, chips refer to compact user interface elements that represent an input, an attribute, or an action. Interface designers have developed chips that allow a user to enter information, make selections, filter content, or trigger actions.

BRIEF DESCRIPTION OF THE DRAWINGS

FIGS. 18 and 19 are illustrations of components of the filter chip section of FIG. 1B.

FIG. 20 is an illustration of example pseudo-code which may be used to implement the filter chip controller of FIGS. 1 and/or 2.

Figure 1A:
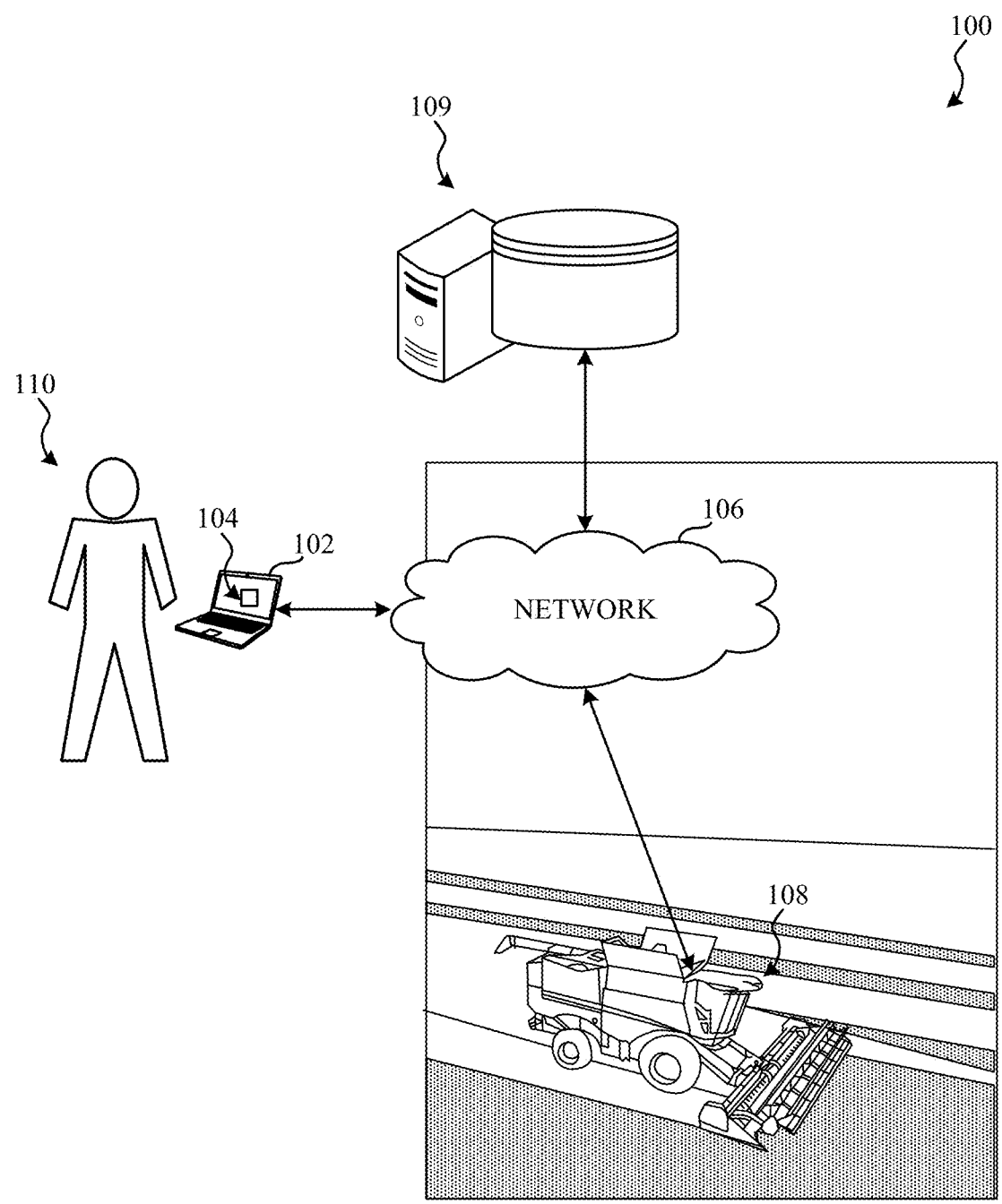
FIG. 1A is an illustration of an environment including an example computer executing an example operations management application.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

FIG. 1A is an illustration of an environment 100 including an example computer 102 executing an example operations management application 104. The environment 100 also includes an example network 106 by which the computer 102 may communication with example agriculture equipment 108 and an example cloud computing network 109. Additionally, the environment 100 includes an example user 110 who may interact with the computer 102 and/or the operations management application 104.

In the illustrated example of FIG. 1A, the computer 102 is implemented by a laptop computer. In additional or alternative examples, the computer 102 may be implemented by one or more tablets, one or more smartphones, one or more desktop computers, one or more computers that are built into the cab of a vehicle. In such examples where multiple devices implement the computer 102, the devices can be configured to communicate via either a local area network (LAN) or a wireless LAN (WLAN). Other implementations of the computer 102 are possible outside of those described above including additional or alternative network infrastructures for multi-device implementations of the computer 102. In the example of FIG. 1A, the computer 102 is configured to operate as a host for the operations management application 104. For example, the computer 102 includes at least one processor, at least one memory, and at least one display that can be utilized by the operations management application 104.

In the illustrated example of FIG. 1A, the operations management application 104 is implemented by a web-based application. In additional or alternative examples, the operations management application 104 may be implemented as a smart-device application, software installed on a device via a computer readable disk, software installed on a device via the Internet, among others. In the example of FIG. 1A, the operations management application 104 is an application that is tailored to managing the operations of a farm. However, additional or alternative implementations of the operations management application 104 are possible.

In the illustrated example of FIG. 1A, the operations management application 104 allows a user (e.g., the user 110) to see what is happening in the user's operation in substantially real time while also learning over time as data is gathered. The operations management application 104 allows a user to collaborate with other individuals and allows the user to utilize tools to make decisions that save time, optimize yield, and increase profits. The operations management application 104 allows a user to direct operations (e.g., at the user's farm) and allows the user to adjust operations as conditions change.

In the illustrated example of FIG. 1A, the network 106 is implemented by the Internet. In additional or alternative examples, the network 106 may be implemented using any suitable wired and/or wireless network(s) including, for example, one or more data buses, one or more LANs, one or more WLANs, one or more cellular networks, one or more private networks, one or more public networks, etc. The network 106 enables the example computer 102, the example agriculture equipment 108, and/or the cloud computing network 109 to be in communication. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events.

In the illustrated example of FIG. 1A, the agriculture equipment 108 is implemented by a combine harvester. In additional or alternative examples, the agriculture equipment 108 may be implemented by a tractor, front loader, cultivator, or any other suitable vehicle. In the example of FIG. 1A, the agriculture equipment 108 is configured to at least transmit data associated with harvesting to a computer (e.g., the computer 102) associated with the operations management application 104. For example, the agriculture equipment 108 can upload data associated with harvesting to the cloud computing network 109. In such examples, the computer 102 can access the data via the cloud computing network 109. In additional or alternative examples, the agriculture equipment 108 is configured to be controlled remotely and to operate autonomously.

In the illustrated example of FIG. 1A, the cloud computing network 109 is implemented as one or more network including one or more computers and/or storage devices. The devices of the cloud computing network 109 are configured to be host software and/or other services (e.g., storage services) subscribed to or purchased by the user 110. For example, cloud computing network 109 can store data associated with harvesting. Additionally or alternatively, the cloud computing network 109 can process the data associated with harvesting to assist the user 110 in analyzing the data.

In the illustrated example of FIG. 1A, the user 110 is a person tasked with managing a farm associated with the operations management application 104. For example, the user 110 can be an owner and/or operator of the farm, a hired hand, among others. The user 110 may interact with the operations management application 104 to display various data for analysis via the computer 102. Additionally, for example, the user 110 can utilize the operations management application 104 to learn about his or her business (e.g., via the computer 102) and then determine actions that the agriculture equipment 108 and/or other equipment (e.g., one or more devices) are to take.

Figure 1B:
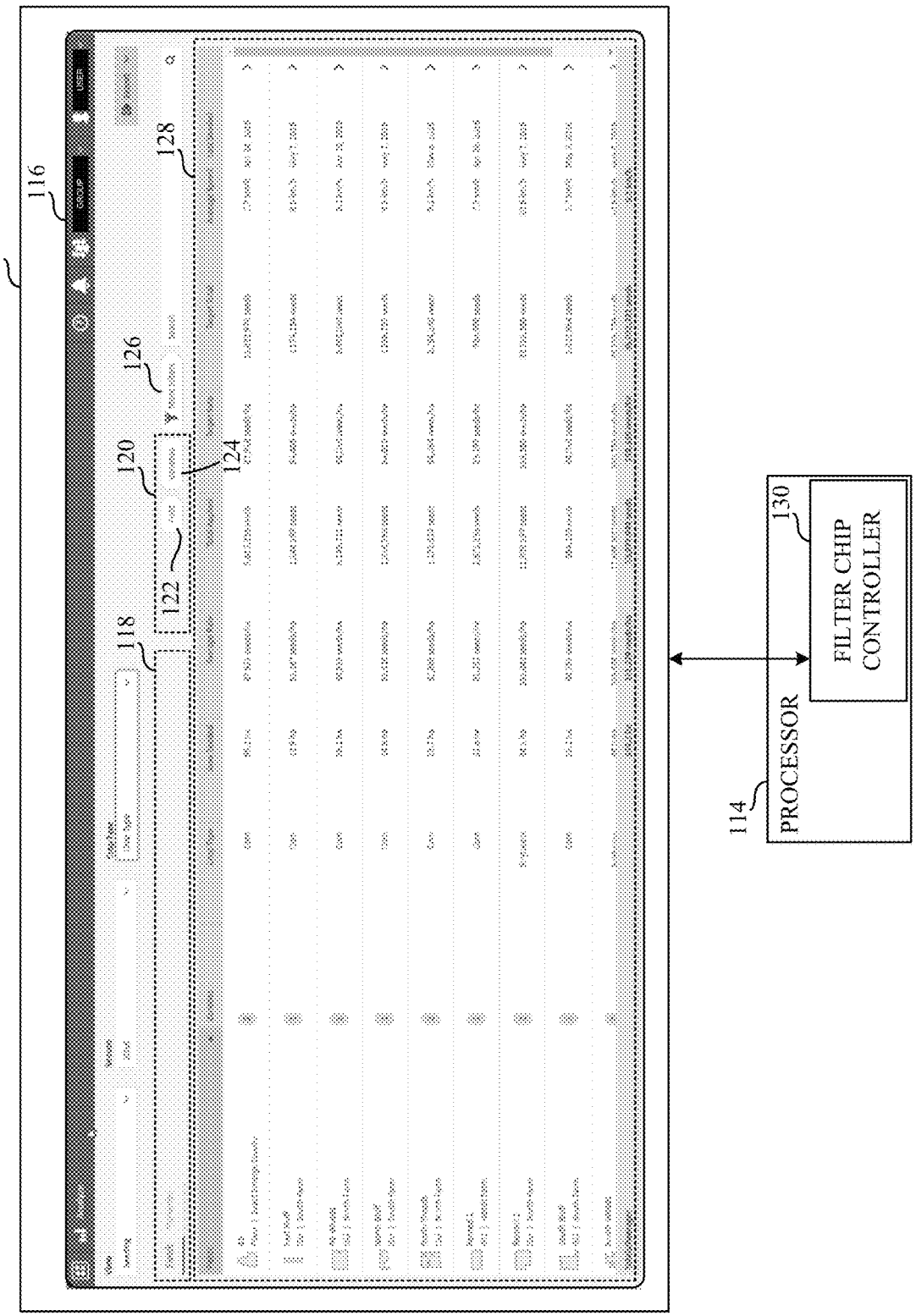
FIG. 1B is a block diagram showing additional detail of the computer and the operations management application of FIG. 1A.

FIG. 1B is a block diagram showing additional detail of the computer 102 and the operations management application 104 of FIG. 1A. The example computer 102 includes an example display 112 and an example processor 114. The example display 112 is displaying an example graphics user interface (GUI) 116 associated with the operations management application 104. For example, the GUI 116 includes an example tab section 118, an example filter section 120 having an example first filter chip 122 and an example second filter chip 124, an example additional filters button 126, and an example data display section 128. The example processor 114 includes an example filter chip controller 130.

In the illustrated example of FIG. 1B, the display 112 is implemented by a liquid crystal display (LCD) of a laptop computer. In additional or alternative examples, the display 112 can be implemented by one or more LCDs, one or more light-emitting diode (LED) displays, one or more organic LED (OLED) displays, one or more active-matrix OLED (AMOLED) displays, one or more electroluminescent displays (ELDs), one or more plasma display panels (PDPs), and/or one or more quantum dot LED (QLED) displays.

In the illustrated example of FIG. 1B, the display 112 is in communication with the processor 114. For example, the display 112 is coupled to the processor 114 via any suitable wired and/or wireless communication technique. In additional or alternative examples, the display 112 and/or the processor 114 may be in communication using software, machine readable instructions, and/or communication protocols specification how information is communicated among the display 112 and/or the processor 114.

In the illustrated example of FIG. 1B, the processor 114 is implemented by a general-purpose computing device (e.g., a central processing unit (CPU)). In additional or alternative examples, the processor 114 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In the illustrated example of FIG. 1B, the processor 114 controls the operations of the computer 102. For example, the processor 114 controls the operations associated with the GUI 116. The processor 114 includes the filter chip controller 130. The filter chip controller 130 controls at least the operations of the filter section 120, the first filter chip 122, the second filter chip 124, and the additional filters button 126.

In the illustrated example of FIG. 1B, the GUI 116 is associated with the operations management application 104. For example, the GUI 116 displays information associated with the farm of FIG. 1. For example, the GUI 116 includes the tab section 118 which displays various tabs (e.g., fields, varieties, etc.) between which the user 110 can switch.

In the illustrated example of FIG. 1B, the GUI 116 includes the filter section 120. The filter section 120 includes the first filter chip 122 and the second filter chip 124. The GUI 116 also includes the additional filters button 126. For example, the first filter chip 122 and the second filter chip 124 are toggleable via the user 110. Additionally, the additional filters button 126 is operable to be selected by the user 110 to open an additional filters modal within which the user 110 can select filters that are not currently displayed in the filter section 120.

In the illustrated example of FIG. 1B, the first filter chip 122 and the second filter chip 124 are primary filter chips. In examples disclosed herein, primary filter chips are visible at any time and allow the user 110 to filter on the most common data for a given view. In examples disclosed herein, secondary filter chips are activated by selecting additional filters button 126. As described above, selecting the additional filters button 126 opens a modal that includes additional data filter options. As used herein, the term "modal" refers to a graphical control element that creates a child window within a parent window and creates a mode that disables the parent window but keeps the parent window visible. Once an additional filter is selected from the modal, the secondary filter chip is appended to the filter section 120. In this manner, the user 110 can select from among the first filter chip 122, the second filter chip 124, and/or the additional filters button 126 to filter data displayed in the data display section 128.

In the illustrated example of FIG. 1B, the first filter chip 122 and the second filter chip 124 can be selected by the user 110 to alter the data displayed in the data display section 128. For example, the user 110 can select the first filter chip 122, labelled "Field" to display data in the data display section 128 that corresponds to one or more fields (e.g., field "85," the "East Bluff" field, the "NE Woods" field, etc.). In this manner, the first filter chip 122 and the second filter chip 124 control the data that is presented in the data display section 128.

In the illustrated example of FIG. 1B, the data display section 128 displays data selected by the user 110. To increase the volume of data that may be displayed to the user 110 in the data display section 128, it is advantageous to reduce the size of the tab section 118 and the filter section 120. However, maintaining a reduced size for the tab section 118 and the filter section 120 creates a problem for presenting a large volume of data therein (e.g., tab data, filter chips, etc.). For example, as new filter chips are appended to the filter section 120, if nothing is done to alter the filter section 120 and/or without providing additional functionality to the user 110, the information displayed in the filter section 120 can become cluttered and difficult to read and/or otherwise interpret.

In the illustrated example of FIG. 1B, examples disclosed herein include horizontally scrollable filter chips that advantageously allow a user (e.g., the user 110) to easily interact with many filter chips that have been applied to any view. As space is limited on the display 112, the horizontal scroll bar allows the user 110 to easily scroll through the filter chips that have been applied. If the user 110 wants to modify a filter, they may modify the filter within the corresponding filter chip, or they can easily clear the filter.

In the illustrated example of FIG. 1B, the filter chip controller 130 is implemented as HyperText Markup Language (HTML) code executing on the processor 114. In additional or alternative examples, the filter chip controller 130 can be implemented by one or more analog or digital circuit(s), logic circuits, programmable processor(s), programmable controller(s), GPU(s), DSP(s), ASIC(s), PLD(s) and/or FPLD(s). The filter chip controller 130 is configured to control the filter section 120 and the additional filters button 126 and/or to determine when to allow horizontal scrolling within the filter section 120. For example, as described below, the filter chip controller 130 is implemented by a first HTML container (e.g., the VC) that renders a second HTML container (e.g., the SC) within the first HTML container. The filter chip controller 130 measures the first HTML container and the second HTML container to determines if the content within the second HTML container (e.g., the SC) is larger than the first HTML container (e.g., the VC). If the content within the second HTML container is larger than the first HTML container, the filter chip controller 130 detects the size difference and renders one or more scroll toggles to the side and/or sides that has and/or have overflowing content.

While an example environment 100 is illustrated in FIGS. 1A and 1B, examples disclosed herein are not limited thereto. For example, while FIG. 1A illustrates a single agriculture equipment 108 implemented as a combine harvester, in other examples the agriculture equipment 108 can be implemented by other farm vehicles and/or implements. For example, in other examples, the agriculture equipment 108 can be implemented by multiple farm vehicles each optionally including an implement.

Figure 2:
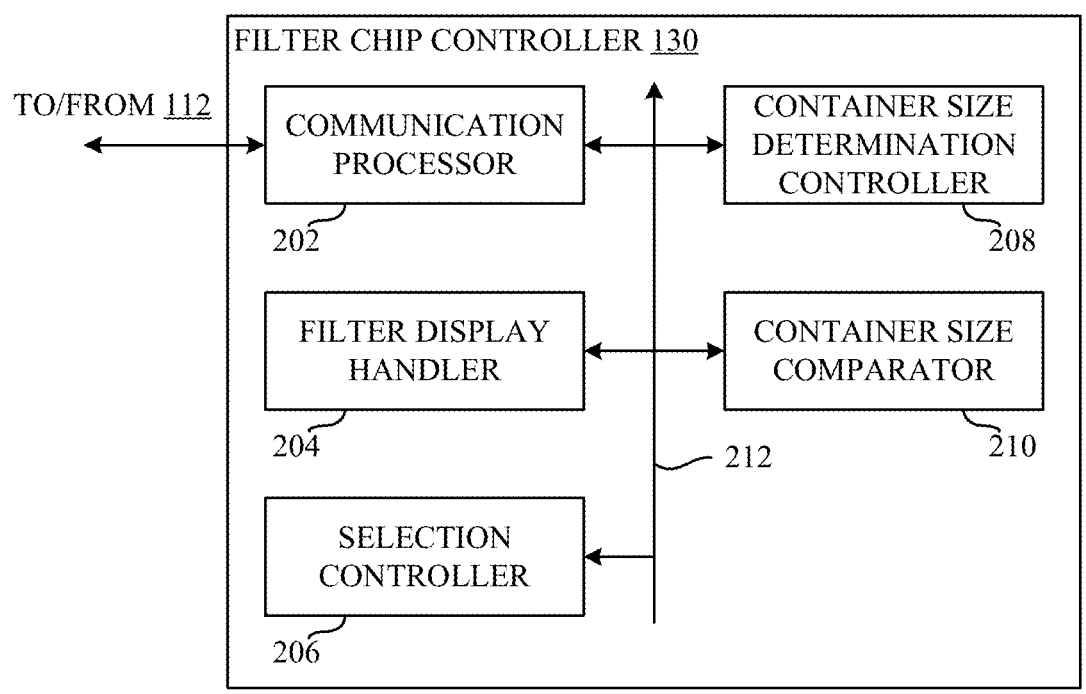
FIG. 2 is a block diagram showing additional detail of the filter chip controller of FIG. 1B.

FIG. 2 is a block diagram showing additional detail of the filter chip controller 130 of FIG. 1B. The filter chip controller 130 includes an example communication processor 202, an example filter display handler 204, an example selection controller 206, an example container size determination controller 208, and an example container size comparator 210. In the example of FIG. 2, one or more of the communication processor 202, the filter display handler 204, the selection controller 206, the container size determination controller 208, and the container size comparator 210 may be implemented as software executing on the processor 114. In the example of FIG. 2, any of the communication processor 202, the filter display handler 204, the selection controller 206, the container size determination controller 208, and/or the container size comparator 210 can communicate via an example communication bus 212.

In examples disclosed herein, the communication bus 212 may be implemented using any suitable wired and/or wireless communication. In additional or alternative examples, the communication bus 212 includes software, machine readable instructions, and/or communication protocols by which information is communicated among the communication processor 202, the filter display handler 204, the selection controller 206, the container size determination controller 208, and/or the container size comparator 210.

In the illustrated example of FIG. 2, the communication processor 202 is implemented by HTML code executing on the processor 114. In additional or alternative examples, the communication processor 202 can be implemented by one or more analog or digital circuit(s), logic circuits, programmable processor(s), programmable controller(s), GPU(s), DSP(s), ASIC(s), PLD(s) and/or FPLD(s). The example communication processor 202 functions as a network interface structured to communicate with other devices (e.g., other components of the processor 114) with a designated physical and data link layer standard.

In some examples, the communication processor 202 implements example means for processing communications. The communication processing means is implemented by executable instructions such as that implemented by at least block 332 of FIG. 3 and/or at least block 426 of FIG. 4. The executable instructions of block 332 of FIG. 3 and/or at least block 426 of FIG. 4 may be executed on at least one processor such as the example processor 2212 of FIG. 22. In other examples, the communication processing means is implemented by hardware logic, hardware implemented state machines, logic circuitry, and/or any other combination of hardware, software, and/or firmware.

In the illustrated example of FIG. 2, the filter display handler 204 is implemented by HTML code executing on the processor 114. In additional or alternative examples, the filter display handler 204 can be implemented by one or more analog or digital circuit(s), logic circuits, programmable processor(s), programmable controller(s), GPU(s), DSP(s), ASIC(s), PLD(s) and/or FPLD(s). The filter display handler 204 is configured to control the display of the filter sections 120, the first filter chip 122, the second filter chip 124, the additional filters button 126, and/or associated windows.

In the illustrated example of FIG. 2, the filter display handler 204 is configured to render a view container (VC) and a scroll container (SC). For example, rendering the VC includes displaying a list of filter chips (e.g., primary filter chips) within the filter section 120. The filter display handler 204 is also configured to display the additional filters button 126. Additionally, depending on the location of the SC with respect to the VC, the filter display handler 204 is configured to render a left scroll toggle (LST) and/or a right scroll toggle (RST). For example, the LST is actionable to scroll the SC left and the RST is actionable to scroll the SC right. Based on user interaction with the scroll toggles, the filter display handler 204 is configured to adjust the rendering of the VC. For example, the filter display handler 204 is configured to re-render the VC, the SC, the LST, and/or the RST after each click of the LST and/or the RST.

In the illustrated example of FIG. 2, the filter display handler 204 is configured to, in response to a user selecting a filter chip, display a menu associated with the selected filter chip. In the example of FIG. 2, the menu associated with the selected filter chip includes characteristics that a user can select to customize and tailor the selected filter chip to their preference. For example, for a filter chip associated with fields one through twenty, the menu associated with the filter chip includes a checkbox for each field. In this manner, a user can select specific ones of the twenty fields to display. In examples disclosed herein, filter chips can be associated with field organization (e.g., clients, farms, fields, etc.), products (e.g., chemicals that farmers apply to their fields), varieties (e.g., seed varieties that farmers plant and harvest), date range, moisture (e.g., the level of moisture in harvested crops), among others. Additionally, in examples disclosed herein, the menu associated with a filter chip include checkboxes for operator, machine type, machine, implement, product type, product form, product manufacture, among others. Other filters and corresponding characteristics are possible based on the data monitored by the operations management application 104.

Additionally, the filter display handler 204 is configured to, in response to a user selecting the additional filters button 126, display an "More Filters" modal. For example, the filter display handler 204 displays the "More Filters" modal within the GUI 116 without redirecting the user 110 away from the GUI 116. As such, the filter display handler 204 displays the "More Filters" modal in proximity to the filter chips, but outside the bounds of the VC (e.g., the filter section 120). In this manner, a user can easily modify and apply the options for the filter chip without redirecting the users to another screen.

In the illustrated example of FIG. 2, in response to the user confirming their selections in and/or closing the menu associated with the selected filter chip, the filter display handler 204 is configured to close the menu associated with the selected filter chip. If the selected filter is not currently displayed in the VC (e.g., the filter section 120), the filter display handler 204 renders a new filter chip for the selected filter. If the selected filter is currently displayed in the VC (e.g., the filter section 120) or after rendering a new filter chip for a filter that was not previously displayed, the filter display handler 204 indicates that the selected filter chip is active. For example, the filter display handler 204 highlights the selected filter chip.

In the illustrated example of FIG. 2, the filter display handler 204 sets the text of the selected filter chip according to the selected characteristic(s). For example, the filter display handler 204 displays the selected characteristics in the selected filter chip. The filter display handler 204 also orients the selected filter chip as the first in the list of filter chips. For example, the filter display handler 204 orients the selected filter chip as the left-most filter chip in the filter section 120.

In some examples, the filter display handler 204 implements example means for displaying filter chips. The filter chip displaying means is implemented by executable instructions such as that implemented by at least blocks 302, 306, 312, 320, 324, 326, 328, and 330 of FIG. 3 and/or at least blocks 410, 420, and 424 of FIG. 4. The executable instructions of blocks 302, 306, 312, 320, 324, 326, 328, and 330 of FIG. 3 and/or blocks 410, 420, and 424 of FIG. 4 may be executed on at least one processor such as the example processor 2212 of FIG. 22. In other examples, the filter chip displaying means is implemented by hardware logic, hardware implemented state machines, logic circuitry, and/or any other combination of hardware, software, and/or firmware.

In the illustrated example of FIG. 2, the selection controller 206 is implemented by HTML code executing on the processor 114. In additional or alternative examples, the selection controller 206 can be implemented by one or more analog or digital circuit(s), logic circuits, programmable processor(s), programmable controller(s), GPU(s), DSP(s), ASIC(s), PLD(s) and/or FPLD(s). The selection controller 206 is configured to handle the selection of icons associated with the filter section 120, the first filter chip 122, the second filter chip 124, the additional filters button 126 and/or one or more scroll toggles.

In the illustrated example of FIG. 2, the selection controller 206 is configured to determine whether a user has selected a filter chip and/or whether the user has selected the additional filters button 126. Additionally, the selection controller 206 is configured to determine whether a user has selected a filter within the "More Filters" modal. The selection controller 206 is configured to determine whether a user has selected a characteristic of a selected filter chip and/or whether the user has confirmed their selection or closed out of the menu associated with the selected filter chip. Additionally, after a user selects a filter chip or filter from within the "More Filters" modal, the selection controller 206 determines whether the selected filter chip and/or filter is currently displayed. The selection controller 206 is also configured to determine whether a user has selected a scroll toggle. For example, the selection controller 206 includes a click handler to cause the filter display handler 204 to move the SC left or right within the VC.

In some examples, the selection controller 206 implements example means for controlling selections. The selection controlling means is implemented by executable instructions such as that implemented by at least blocks 304, 308, 310, 314, 316, 318, and 322 of FIG. 3 and/or at least block 422 of FIG. 4. The executable instructions of blocks 304, 308, 310, 314, 316, 318, and 322 of FIG. 3 and/or block 422 of FIG. 4 may be executed on at least one processor such as the example processor 2212 of FIG. 22. In other examples, the selection controlling means is implemented by hardware logic, hardware implemented state machines, logic circuitry, and/or any other combination of hardware, software, and/or firmware.

In the illustrated example of FIG. 2, the container size determination controller 208 is implemented by HTML code executing on the processor 114. In additional or alternative examples, the container size determination controller 208 can be implemented by one or more analog or digital circuit(s), logic circuits, programmable processor(s), programmable controller(s), GPU(s), DSP(s), ASIC(s), PLD(s) and/or FPLD(s). The container size determination controller 208 is configured to determine the size of the VC and SC.

In the illustrated example of FIG. 2, the container size determination controller 208 is configured to determine a location of a left edge of the SC (e.g., a left scroll edge (LSE)) and a location of a right edge of the SC (e.g., a right scroll edge (RSE)). For example, the container size determination controller 208 is configured to determine the coordinates of a pixel on the LSE and the coordinates of a pixel on the RSE. In the example of FIG. 2, the container size determination controller 208 is configured to determine a location of a left edge of the VC (e.g., a left view edge (LVE)) and a location of a right edge of the VC (e.g., a right view edge (RVE)). For example, the container size determination controller 208 is configured to determine the coordinates of a pixel on the LVE and the coordinates of a pixel on the RVE.

In some examples, the container size determination controller 208 implements example means for container size determination. The container size determining means is implemented by executable instructions such as that implemented by at least blocks 402, 404, 406, and 408 of FIG. 4. The executable instructions of blocks 402, 404, 406, and 408 of FIG. 4 may be executed on at least one processor such as the example processor 2212 of FIG. 22. In other examples, the container size determining means is implemented by hardware logic, hardware implemented state machines, logic circuitry, and/or any other combination of hardware, software, and/or firmware.

In the illustrated example of FIG. 2, the container size comparator 210 is implemented by HTML code executing on the processor 114. In additional or alternative examples, the container size comparator 210 can be implemented by one or more analog or digital circuit(s), logic circuits, programmable processor(s), programmable controller(s), GPU(s), DSP(s), ASIC(s), PLD(s) and/or FPLD(s). The container size comparator 210 is configured to compare the size of the VC to the size of the SC.

In the illustrated example of FIG. 2, the container size comparator 210 is configured to determine whether the LSE is less than the LVE with respect to the left side of the GUI 116. In response to determining that the LSE is less than the LVE with respect to the left side of the GUI 116, the container size comparator 210 indicates that the left scroll toggle (LST) is to be rendered. In the example of FIG. 2, the container size comparator 210 is configured to determine whether the RVE is less than the RSE with respect to the left side of the GUI 116. In response to determining that the RVE is less than the RSE with respect to the left side of the GUI 116, the container size comparator 210 indicates that the right scroll toggle (RST) is to be rendered.

In some examples, the container size comparator 210 implements example means for container size comparison. The container size comparing means is implemented by executable instructions such as that implemented by at least blocks 412, 414, 416, and 418 of FIG. 4. The executable instructions of blocks 412, 414, 416, and 418 of FIG. 4 may be executed on at least one processor such as the example processor 2212 of FIG. 22. In other examples, the container size comparing means is implemented by hardware logic, hardware implemented state machines, logic circuitry, and/or any other combination of hardware, software, and/or firmware.

While an example manner of implementing the filter chip controller 130 of FIG. 1 is illustrated in FIG. 2, one or more of the elements, processes and/or devices illustrated in FIG. 2 may be combined, divided, re-arranged, omitted, eliminated and/or implemented in any other way. Further, the example communication processor 202, the example filter display handler 204, the example selection controller 206, the example container size determination controller 208, the container sizer comparator 210 and/or, more generally, the example filter chip controller 130 of FIG. 2 may be implemented by hardware, software, firmware and/or any combination of hardware, software and/or firmware. Thus, for example, any of the example communication processor 202, the example filter display handler 204, the example selection controller 206, the example container size determination controller 208, the container sizer comparator 210 and/or, more generally, the example filter chip controller 130 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication processor 202, the example filter display handler 204, the example selection controller 206, the example container size determination controller 208, the container sizer comparator 210 and/or, more generally, the example filter chip controller 130 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example filter chip controller 130 of FIG. 3 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
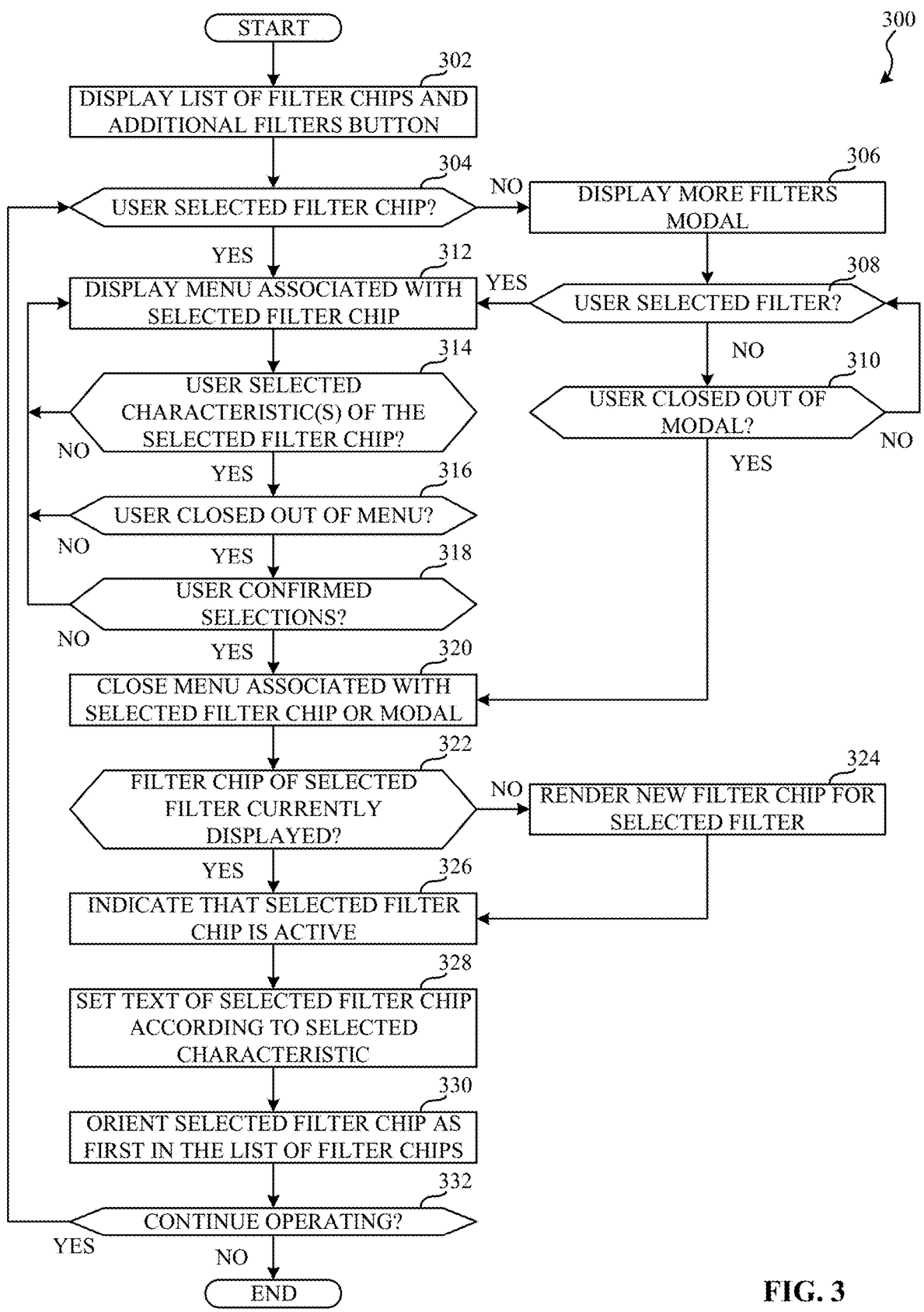
FIG. 3 is a flowchart representative of machine-readable instructions that may be executed to implement the filter chip controller of FIGS. 1 and/or 2.

Flowcharts representative of example hardware logic, machine readable instructions, hardware implemented state machines, and/or any combination thereof for implementing the filter chip controller 130 of FIG. 2 is shown in FIGS. 3 and/or 4. The machine readable instructions may be one or more executable programs or portion(s) of an executable program for execution by a computer processor and/or processor circuitry, such as the processor 2212 shown in the example processor platform 2200 discussed below in connection with FIG. 22. The program(s) may be embodied in software stored on a non-transitory computer readable storage medium such as a CD-ROM, a floppy disk, a hard drive, a DVD, a Blu-ray disk, or a memory associated with the processor 2212, but the entire program and/or parts thereof could alternatively be executed by a device other than the processor 2212 and/or embodied in firmware or dedicated hardware. Further, although the example program(s) is (are) described with reference to the flowcharts illustrated in FIGS. 3 and/or 4, many other methods of implementing the example filter chip controller 130 may alternatively be used.

For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3 and/or 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart representative of machine-readable instructions 300 which may be executed to implement the filter chip controller 130 of FIGS. 1 and/or 2. The machine-readable instructions 300 begin at block 302 where the filter display handler 204 displays a list of filter chips and an additional filters button. For example, the filter display handler 204 displays the filter section 120 including the first filter chip 122 and the second filter chip 124 and additionally displays the additional filters button 126. At block 304, the selection controller 206 determines whether a user has selected a filter chip.

In the illustrated example of FIG. 3, in response to the selection controller 206 determining that the user has selected a filter chip (block 304: YES), the machine-readable instructions 300 proceed to block 312. In response to the selection controller 206 determining that the user has not selected a filter chip (block 304: NO), the machine-readable instructions 300 proceed to block 306. For example, the selection controller 206 determining that the user has not selected a filter chip is indicative of the user selecting the additional filters button 126. At block 306, the filter display handler 204 displays the "More Filters" modal.

In the illustrated example of FIG. 3, at block 308, the selection controller 206 determines whether the user selected a filter within the "More Filters" modal. In response to the selection controller 206 determining that the user selected a filter within the "More Filters" modal (block 308: YES), the machine-readable instructions 300 proceed to block 312. In response to the selection controller 206 determining that the user has not selected a filter within the "More Filters" modal (block 308: NO), the machine-readable instructions 300 proceed to block 310. At block 310, the selection controller 206 determines whether the user has closed out of the "More Filters" modal.

In the illustrated example of FIG. 3, in response to the selection controller 206 determining that the user has not closed out of the "More Filters" modal (block 310: NO), the machine-readable instructions 300 return to block 308. In response to the selection controller 206 determining that the user has closed out of the "More Filters" modal (block 310: YES), the machine-readable instructions 300 return to block 320.

In the illustrated example of FIG. 3, at block 312, the filter display handler 204 displays a menu associated with the selected filter. At block 314, the selection controller 206 determines whether the user selected one or more characteristics of the selected filter chip. In response to the selection controller 206 determining that the user has not selected one or more characteristics of the selected filter chip (block 314: NO), the machine-readable instructions 300 return to block 312. In response to the selection controller 206 determining that the user has selected one or more characteristics of the selected filter chip (block 314: YES), the machine-readable instructions 300 proceed to block 316.

In the illustrated example of FIG. 3, at block 316, the selection controller 206 determines whether the user has closed out of the menu associated with the selected filter chip. For example, when the user is interacting with the menu associated with a currently displayed filter chip, closing out of the menu associated with the selected filter chip corresponds to the user selecting a "Close" or a "Done" button included in the menu associated with the selected filter chip. Alternatively, when the user is interacting with the menu associated with a filter chip in the "More Filters" modal, closing out of the menu associated with the selected filter chip corresponds to the user selecting one or more characteristics of the selected filter chip.

In the illustrated example of FIG. 3, in response to the selection controller 206 determining that the user has not closed out of the menu associated with the selected filter chip (block 316: NO), the machine-readable instructions return to block 312. In response to the selection controller 206 determining that the user has closed out of the menu associated with the selected filter chip (block 316: YES), the machine-readable instructions proceed to block 318. At block 318, the selection controller 206 determines whether the user has confirmed his or her selections.

In the illustrated example of FIG. 3, in response to the selection controller 206 determining that the user has not confirmed his or her selections (block 318: NO), the machine-readable instructions return to block 312. In response to the selection controller 206 determining that the user has confirmed his or her selections (block 318: YES), the machine-readable instructions proceed to block 320. At block 320, the filter display handler 204 closes the menu associated with the selected filter chip or the "More Filters" modal depending on if the user has opened the "More Filters" modal.

In the illustrated example of FIG. 3, at block 322, the selection controller 206 determines whether a filter chip of the selected filter is currently displayed. For example, primary filter chips will be displayed by default whereas secondary filter chips may be displayed after being activated by the user. In response to the selection controller 206 determining that the filter chip of the selected filter is currently displayed (block 322: YES), the machine-readable instructions 300 proceed to block 326. In response to the selection controller 206 determining that the filter chip of the selected filter is not currently displayed (block 322: NO), the machine-readable instructions 300 proceed to block 324.

In the illustrated example of FIG. 3, at block 324, the filter display handler 204 renders a new filter chip (e.g., a filter chip that is not currently displayed) for the selected filter. At block 326, the filter display handler 204 indicates that the selected filter chip is active. For example, the filter display handler 204 can fill a previously unfilled filter chip. In other words, the filter display handler 204 can highlight the selected filter chip. At block 328, the filter display handler 204 sets the text of the selected filter chip according to the selected characteristic. For example, the filter display handler 204 displays the text of the selected characteristic in the selected filter chip). At block 330, the filter display handler 204 orients the selected filter chip as the first filter chip in the list of filter chips (e.g., in the filter section 120). For example, the filter display handler 204 appends the selected filter chip to the front of the currently displayed filter chips.

In the illustrated example of FIG. 3, at block 332, the communication processor 202 determines whether the filter chip controller 130 is to continue operating. For example, a condition that would cause the communication processor 202 to determine that the filter chip controller 130 is to continue operating includes the user continuing to interact with the GUI 116. Alternatively, a condition that would cause the communication processor 202 to determine that the filter chip controller 130 is not to continue operating includes the user navigating away from the GUI 116. In response to the communication processor 202 determining that the filter chip controller 130 is to continue operating (block 332: YES), the machine-readable instructions 300 return to block 304. In response to the communication processor 202 determining that the filter chip controller 130 is not to continue operating (block 332: NO), the machine-readable instructions 300 terminate.

Figure 4:
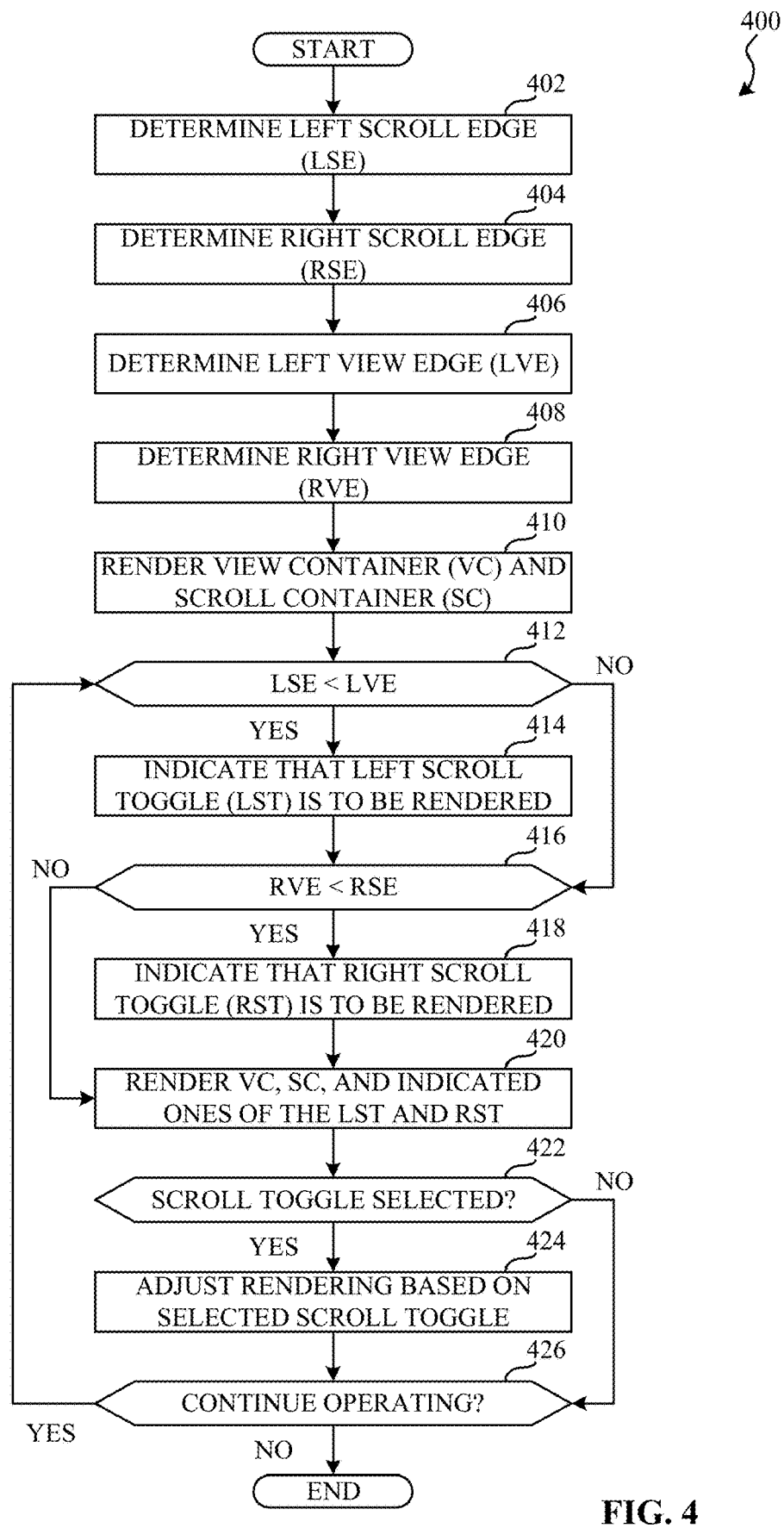
FIG. 4 is a flowchart representative of machine-readable instructions that may be executed to implement the filter chip controller of FIGS. 1 and/or 2.

FIG. 4 is a flowchart representative of machine-readable instructions 400 which may be executed to implement the filter chip controller 130 of FIGS. 1 and/or 2. The machine-readable instructions 400 begin at block 402 where the container size determination controller 208 determines the location of the left edge of the scroll container (SC) (e.g., the left scroll edge (LSE)). For example, the container size determination controller 208 determines the coordinates of a pixel on the LSE. At block 404, the container size determination controller 208 determines the location of the right edge of the SC (e.g., the right scroll edge (RSE)). For example, the container size determination controller 208 determines the coordinates of a pixel on the RSE.

In the illustrated example of FIG. 4, at block 406, the container size determination controller 208 determines the location of the left edge of the view container (VC) (e.g., the left view edge (LVE)). For example, the container size determination controller 208 determines the coordinates of a pixel on the LVE. At block 408, the container size determination controller 208 determines the location of the right edge of the VC (e.g., the right view edge (RVE)). For example, the container size determination controller 208 determines the coordinates of a pixel on the RVE. At block 410, the filter display handler 204 renders the VC and SC.

In the illustrated example of FIG. 4, at block 412, the container size comparator 210 determines whether the LSE is less than the LVE with respect to the left side of the GUI 116. For example, the container size comparator 210 determines whether the LSE is closer to the left edge of the GUI 116 than the LVE. For example, the container size comparator 210 determines whether the location of the LSE is less than the location of the LVE. In response to the container size comparator 210 determining that the LSE is less than the LVE with respect to the left side of the GUI 116 (block 412: YES), the machine-readable instructions 400 proceed to block 414. In response to the container size comparator 210 determining that the LSE is greater than or equal to the LVE (block 412: NO), the machine-readable instructions 400 proceed to block 416. At block 414, the container size comparator 210 indicates that the left scroll toggle (LST) is to be rendered.

In the illustrated example of FIG. 4, at block 416, the container size comparator 210 determines whether the RVE is less than the RSE with respect to the left side of the GUI 116. For example, the container size comparator 210 determines whether the RVE is closer to the left edge of the GUI 116 than the RSE. For example, the container size comparator 210 determines whether the location of the RVE is less than the location of the RSE. In response to the container size comparator 210 determining that the RVE is less than the RSE with respect to the left side of the GUI 116 (block 416: YES), the machine-readable instructions 400 proceed to block 418. In response to the container size comparator 210 determining that the RVE is greater than or equal to the RSE (block 416: NO), the machine-readable instructions 400 proceed to block 420. At block 418, the container size comparator 210 indicates that the right scroll toggle (RST) is to be rendered.

In the illustrated example of FIG. 4, at block 420, the filter display handler 204 renders the VC, the SC, and the indicated ones of the LST and the RST. For example, the filter display handler 204 renders the LST and the RST such that the LST and the RST have sizes that are determined from the height of the VC. The filter display handler 204 determines the height of the LST and the RST after the filter display handler 204 has rendered the VC and/or the SC. As such, when the filter display handler 204 initially renders the filter section 120, the filter section 120 will not include the LST and/or the RST. Additionally, when the filter display handler 204 subsequently renders the filter section 120, the filter display handler 204 may render the LST and/or the RST depending on whether LSE is less than the LVE with respect to the left side of the GUI 116 and/or whether the RVE is less than the RSE with respect to the left side of the GUI 116.

In the illustrated example of FIG. 4, at block 422, the selection controller 206 determines whether the user has selected a scroll toggle. In response to the selection controller 206 determining that the user has selected a scroll toggle (block 422: YES), the machine-readable instructions 400 proceed to block 422. In response to the selection controller 206 determining that the user has not selected a scroll toggle (block 422: NO), the machine-readable instructions 400 proceed to block 426.

In the illustrated example of FIG. 4, at block 424, the filter display handler 204 adjusts the rendering of the VC, the SC, the RST, and/or the LST based on the selected scroll toggle. For example, in response to selection of the LST, the filter display handler 204 adjusts the rendering of the VC, the SC, the LST, and/or the RST to display one or more filter chips included in the SC that are left of previously displayed filter chips. Alternatively, in response to selection of the RST, the filter display handler 204 adjusts the rendering of the VC, the SC, the LST, and/or the RST to display one or more filter chips included in the SC that are right of previously displayed filter chips. In this manner, the size of the SC is not predetermined and is regulated by number of filter chips that have been selected by a user. Thus, while examples disclosed herein focus on filter chips, examples disclosed herein are not limited thereto. For example, the consumer of the filter chip controller 130 may insert whatever they like into the SC, and the filter chip controller 130 will size and render the VC, the SC, the RST, and/or the LST with the correct scroll buttons and overflow management. For example, as opposed to filter chips the SC can include action chips that a user can select to trigger an action in a device. For example, the user 110 could select an action chip that causes the computer 102 and/or the cloud computing network 109 to transmit an instruction to the agriculture equipment 108 to cause the agriculture equipment 108 to take an action).

In the illustrated example of FIG. 4, at block 426, the communication processor 202 determines whether the filter chip controller 130 is to continue operating. For example, a condition that would cause the communication processor 202 to determine that the filter chip controller 130 is to continue operating includes the user continuing to interact with the GUI 116. Alternatively, a condition that would cause the communication processor 202 to determine that the filter chip controller 130 is not to continue operating includes the user navigating away from the GUI 116. In response to the communication processor 202 determining that the filter chip controller 130 is to continue operating (block 426: YES), the machine-readable instructions 400 return to block 412. In response to the communication processor 202 determining that the filter chip controller 130 is not to continue operating (block 426: NO), the machine-readable instructions 400 terminate.

Figure 5:
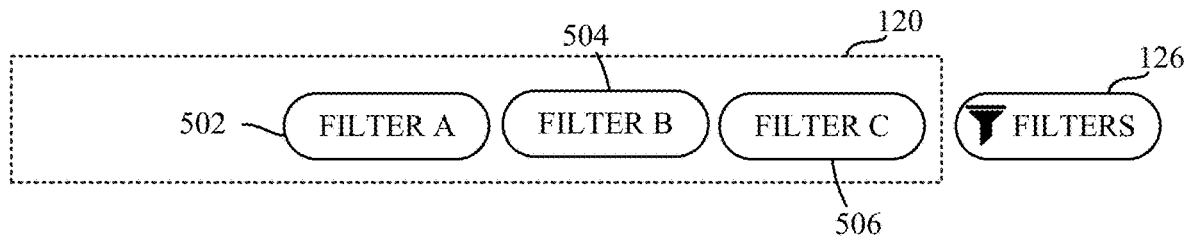
FIGS. 5-17 are illustrations of operations of the filter chip controller of FIG. 2 when interacting with a user.

FIG. 5 is an illustration of an example implementation of the filter section 120 and the additional filters button 126. In the example of FIG. 5, the filter section 120 includes an example first filter chip 502, an example second filter chip 504, and an example third filter chip 506. The filter section 120 illustrated in FIG. 5, represents a default state and the first filter chip 502, the second filter chip 504, and the third filter chip 506 correspond to primary filter chips. Additional filters chips can be added beyond the primary filter chips via the additional filters button 126. The first filter chip 502, the second filter chip 504, the third filter chip 506, and/or any secondary filter chips are configured to be selected to alter characteristics by which data is filtered based on respective ones of the filter chips. For example, the data is related to an agricultural application such as farming.

Figure 6:
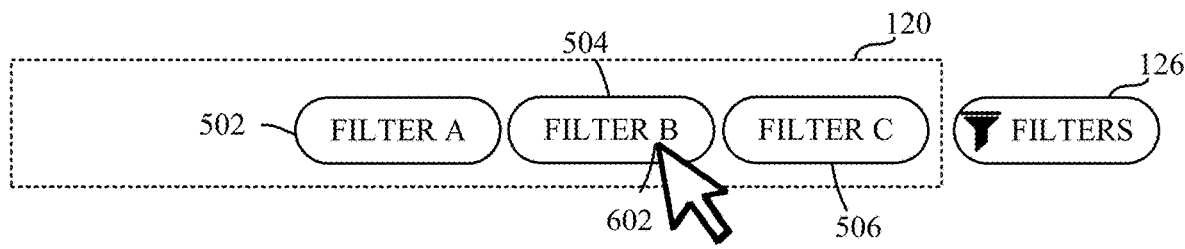

FIG. 6 is an illustration of an interaction between the user 110 and the filter section 120 and the additional filters button 126 of FIG. 5. For example, the user 110 selects the second filter chip 504 at operation 602.

Figure 7:
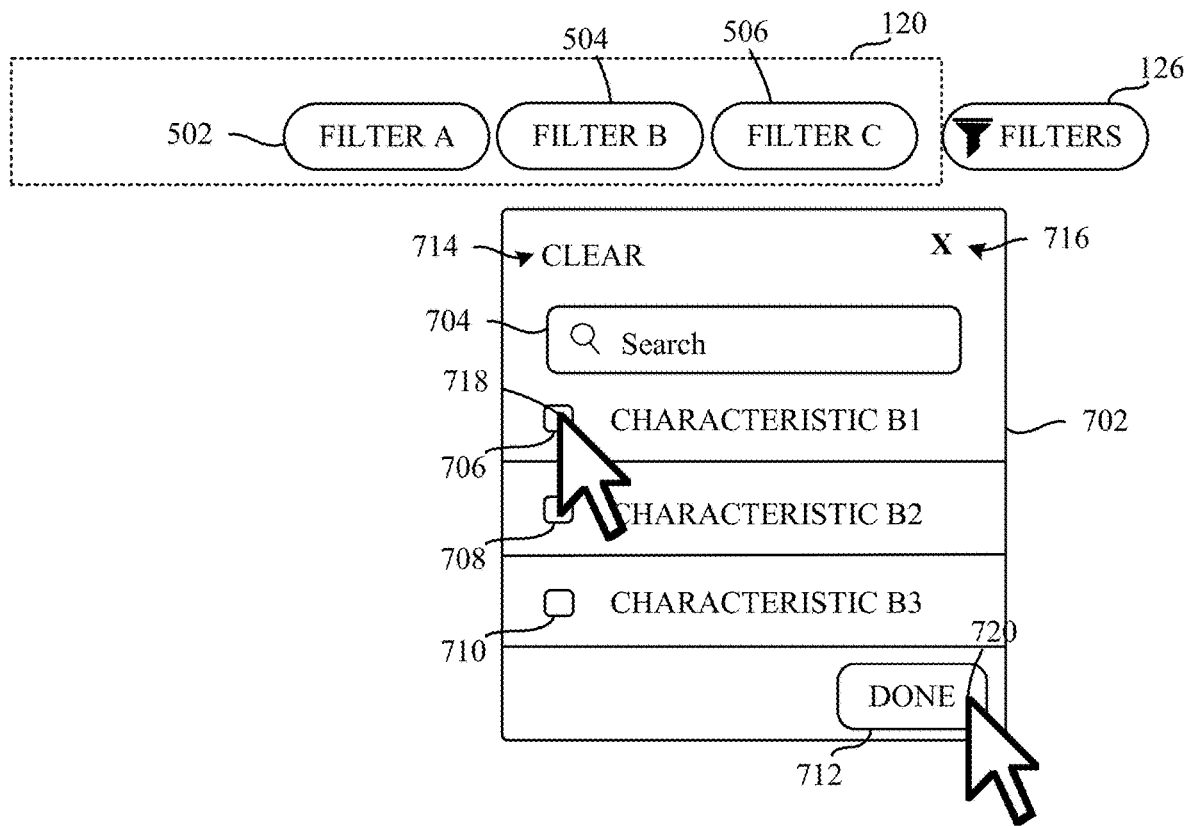

FIG. 7 is an illustration of interactions between the user 110 and an example menu 702 associated with the second filter chip 504. For example, when the user 110 selects the second filter chip 504, the filter display handler 204 displays the menu 702 to allow the user 110 to make selections in the characteristics of the selected primary filter chip. The menu 702 includes an example search bar 704, an example first checkbox 706, an example second checkbox 708, an example third checkbox 710, an example "Done" button 712, an example "Clear" button 714, and an example "X" button 716.

In the illustrated example of FIG. 7, the search bar 704 allows a user to search through the possible characteristics that can be applied to the second filter chip 504. The first checkbox 706, the second checkbox 708, and the third checkbox 710 correspond to different characteristics that the user 110 can apply to the second filter chip 504. For example, at operation 718, the user 110 selects the first checkbox 706 to apply "Characteristic B1" to the second filter chip 504.

In the illustrated example of FIG. 7, the "Done" button 712 allows the user 110 to confirm the selected characteristics to apply to the second filter chip 504. For example, at operation 720, the user 110 selects the "Done" button 712 to confirm the selection of the first checkbox 706. The "Clear" button 714 allows the user 110 to clear the selections of the first checkbox 706, the second checkbox 708, and/or the third checkbox 710. The "X" button 716 allows the user 110 to close out of the menu 702 without confirming the selected characteristics to apply to the second filter chip 504.

Figure 8:
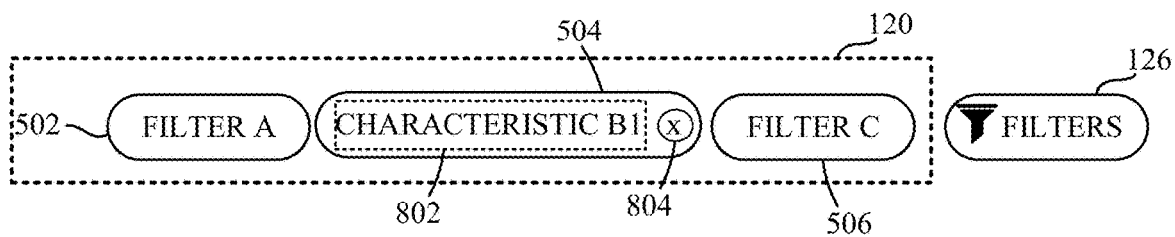

FIG. 8 is an illustration of the filter section 120 and the additional filters button 126 after the selection of a primary filter chip and the application of a specific characteristic to the primary filter chip. For example, after the user 110 selects the second filter chip 504, the filter display handler 204 indicates that the second filter chip 504 (e.g., styles the second filter chip 504) is active by highlighting the second filter chip 504. Additionally, the filter display handler 204 sets an example textbox 802 of the second filter chip 504 according to the selected characteristic (e.g., "Characteristic B1"). Being that the second filter chip 504 is now active, the second filter chip 504 includes an example cancel button 804 to allow the user 110 to deactivate the second filter chip 504.

Figure 9:
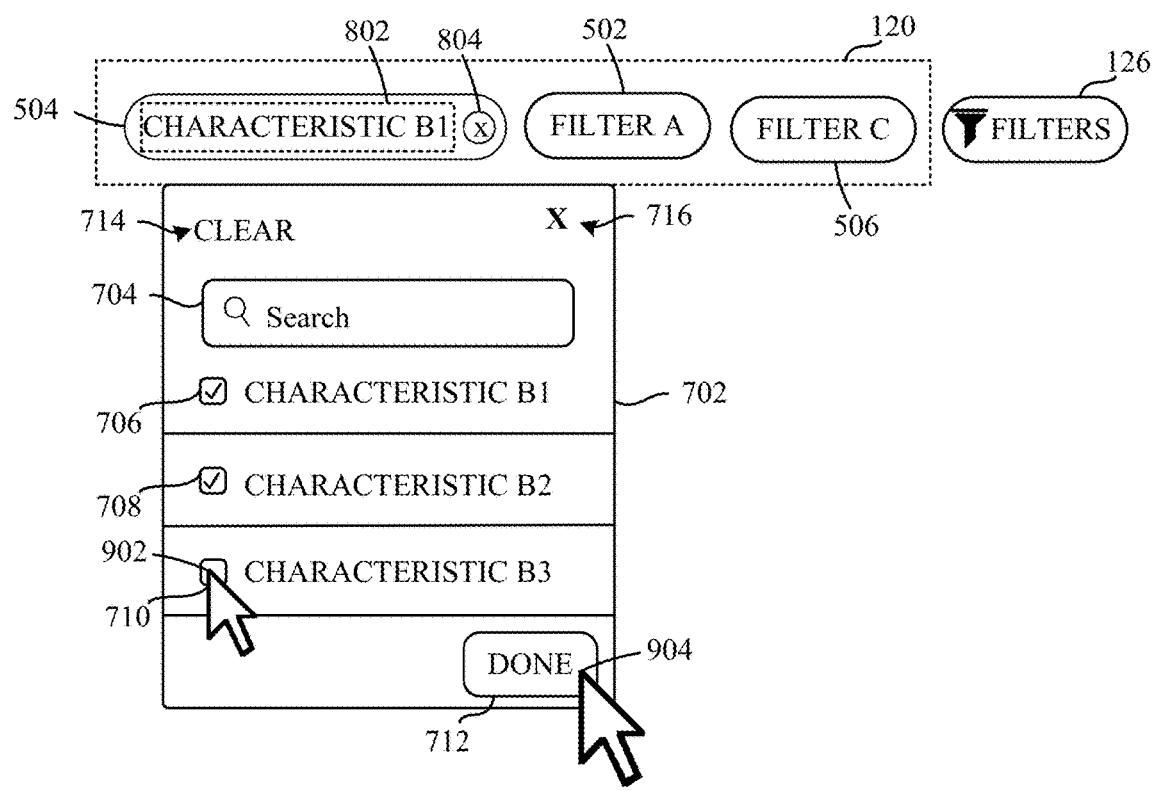

FIG. 9 is an illustration of interactions between the user 110 and the menu 702 associated with the second filter chip 504 after the user 110 has previously activated the second filter chip 504. For example, after the filter display handler 204 indicates that the second filter chip 504 is active and sets the textbox 802 according to the selected characteristics, the filter display handler 204 orients the second filter chip 504 as the first in the filter section 120. For example, the filter display handler 204 orders the first filter chip 502, the second filter chip 504, and the third filter chip 506 such that the most recently activated filter chip is arranged in the first position from the left in the array of filter chips (e.g., within the filter section 120).

In the illustrated example of FIG. 9, the user 110 opens the menu 702 of the second filter chip 504 and modifies the applied characteristics to include more characteristics. For example, the user 110 has selected the second checkbox 708 to apply "Characteristic B2" to the second filter chip 504 and at operation 902, the user 110 selects the third checkbox 710 to apply "Characteristic B3" to the second filter chip 504. At operation 904, the user 110 selects the "Done" button 712 to confirm the selection of the first checkbox 706, the second checkbox 708, and the third checkbox 710.

Figure 10:
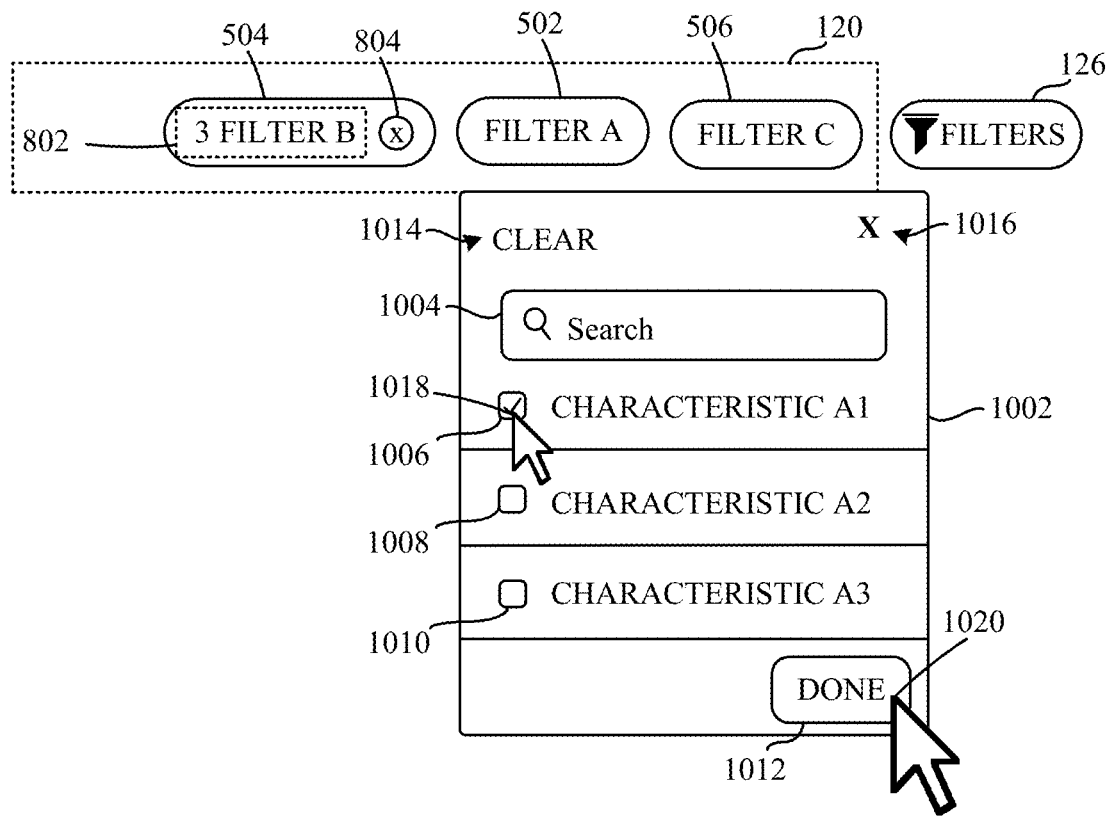

FIG. 10 is an illustration of interactions between the user 110 and an example menu 1002 associated with the first filter chip 502. For example, when the user 110 selects the first filter chip 502, the filter display handler 204 displays the menu 1002 to allow the user 110 to make selections in the characteristics of the selected primary filter chip. The menu 1002 includes an example search bar 1004, an example first checkbox 1006, an example second checkbox 1008, an example third checkbox 1010, an example "Done" button 1012, an example "Clear" button 1014, and an example "X" button 1016. Additionally, as the user 110 previously updated the second filter chip 504, the filter display handler 204 sets the textbox 802 of the second filter chip 504 according to the selected characteristics.

In the illustrated example of FIG. 10, the search bar 1004 allows a user to search through the possible characteristics that can be applied to the first filter chip 502. The first checkbox 1006, the second checkbox 1008, and the third checkbox 1010 correspond to different characteristics that the user 110 can apply to the first filter chip 502. For example, at operation 1018, the user 110 selects the first checkbox 1006 to apply "Characteristic A1" to the first filter chip 502.

In the illustrated example of FIG. 10, the "Done" button 1012 allows the user 110 to confirm the selected characteristics to apply to the first filter chip 502. For example, at operation 1020, the user 110 selects the "Done" button 1012 to confirm the selection of the first checkbox 1006. The "Clear" button 1014 allows the user 110 to clear the selections of the first checkbox 1006, the second checkbox 1008, and/or the third checkbox 1010. The "X" button 1016 allows the user 110 to close out of the menu 1002 without confirming the selected characteristics to apply to the first filter chip 502.

Figure 11:
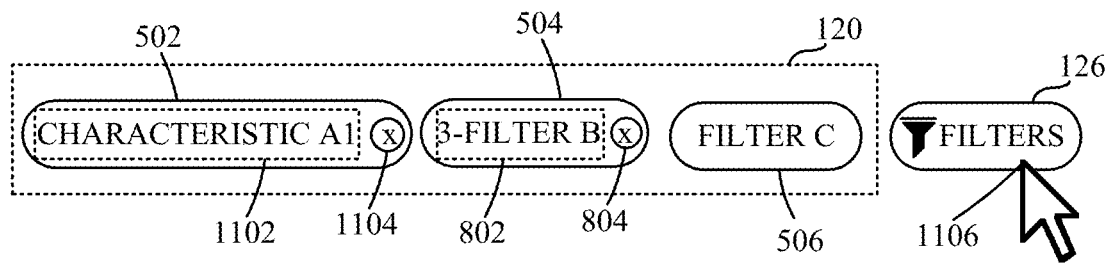

FIG. 11 is an illustration of the filter section 120 and the additional filters button 126 after the selection of the first filter chip 502 and the application of a specific characteristic to the first filter chip 502. For example, after the user 110 selects the first filter chip 502, the filter display handler 204 indicates that the first filter chip 502 (e.g., styles the first filter chip 502) is active by highlighting the first filter chip 502. Additionally, the filter display handler 204 sets an example textbox 1102 of the first filter chip 502 according to the selected characteristic (e.g., "Characteristic A1"). Being that the first filter chip 502 is now active, the first filter chip 502 includes an example cancel button 1104 to allow the user 110 to deactivate the first filter chip 502.

In the illustrated example of FIG. 11, after the filter display handler 204 indicates that the first filter chip 502 is active and sets the textbox 1102 according to the selected characteristics, the filter display handler 204 orients the first filter chip 502 as the first in the filter section 120. For example, the filter display handler 204 orders the first filter chip 502, the second filter chip 504, and the third filter chip 506 such that the most recently activated filter chip is arranged in the first position from the left in the array of filter chips (e.g., within the filter section 120). Additionally, at operation 1106, the user 110 selects the additional filters button 126.

Figure 12:
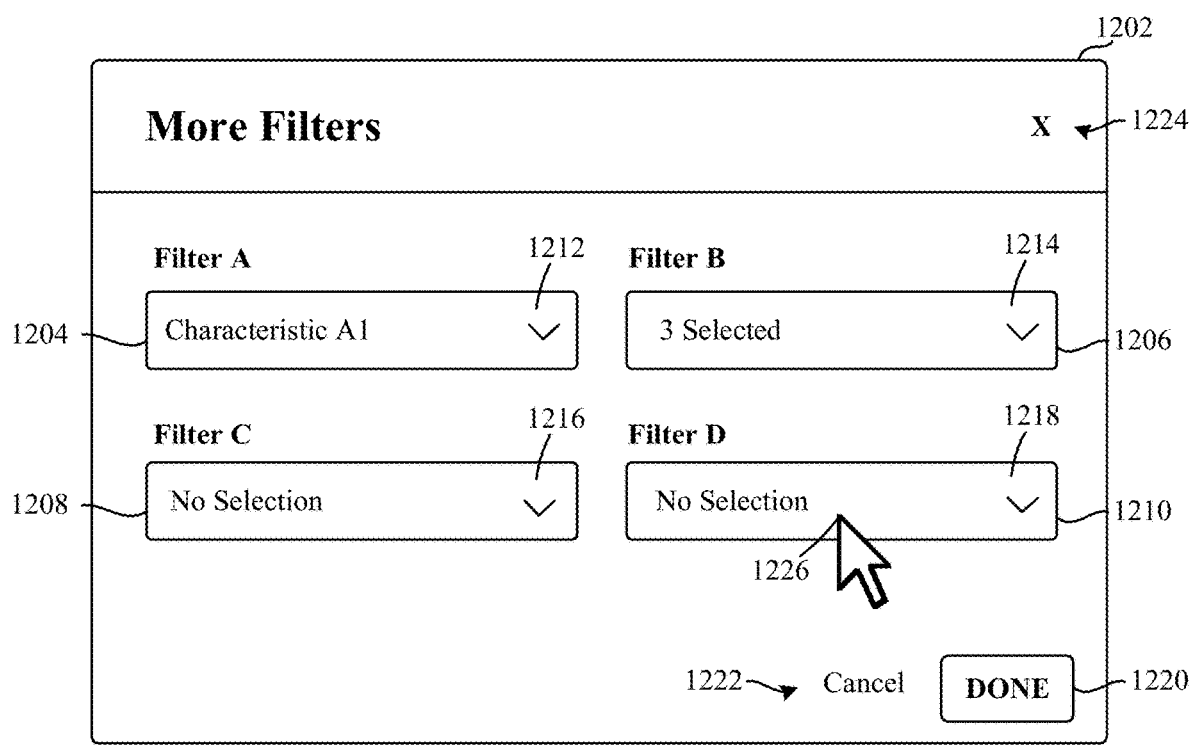

FIG. 12 is an illustration of an example "More Filters" modal 1202 activated when the user 110 selects the additional filters button 126. The "More Filters" modal 1202 is a popup window that appears (e.g., pops up) within the GUI 116. The "More Filters" modal 1202 includes the available filters and corresponding characteristics. The "More Filters" modal 1202 includes an example first dropdown menu 1204 corresponding to the first filter chip 502, an example second dropdown menu 1206 corresponding to the second filter chip 504, an example third dropdown menu 1208 corresponding to the third filter chip 506, and an example fourth dropdown menu 1210 corresponding to a secondary filter chip.

In the illustrated example of FIG. 12, the first dropdown menu 1204 includes an example first toggle 1212. The second dropdown menu 1206 includes an example second toggle 1214. The third dropdown menu 1208 includes an example third toggle 1216. The fourth dropdown menu 1210 includes an example fourth toggle 1218. Each of the first toggle 1212, the second toggle 1214, the third toggler 1216, and the fourth toggle 1218 allows the user 110 to access the available characteristics to apply to the first filter chip 502, the second filter chip 504, the third filter chip 506, and the secondary filter chip, respectively.

In the illustrated example of FIG. 12, the "More Filters" modal 1202 includes an example "Done" button 1220, an example "Cancel" button 1222, and an example "X" button 1224. The "Done" button 1220 allows the user 110 to confirm the selected characteristics to apply to any of the first filter chip 502, the second filter chip 504, the third filter chip 506, and/or any secondary filter chips. For example, at operation 1226, the user 110 selects the fourth dropdown menu 1210 to access characteristics available to apply to the secondary filter chip. In the example of FIG. 12, the "Cancel" button 1222 allows the user 110 to close out of the "More Filters" modal 1202 without confirming the selected characteristics to apply to any of the first filter chip 502, the second filter chip 504, the third filter chip 506, and/or any secondary filter chips. The "X" button 1224 allows the user 110 to close out of the "More Filters" modal 1202 without confirming the selected characteristics to apply to any of the first filter chip 502, the second filter chip 504, the third filter chip 506, and/or any secondary filter chips.

Figure 13:
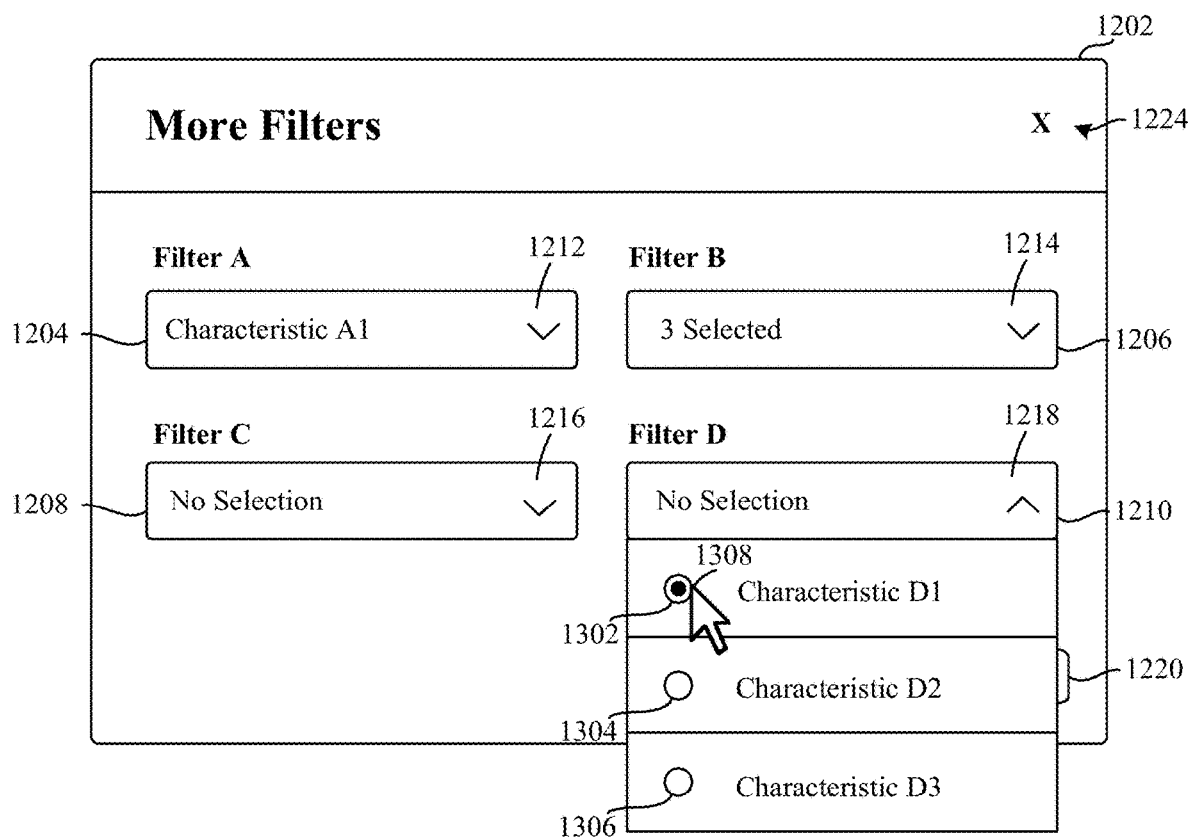

FIG. 13 is an illustration of interactions between the user 110 and an example first selection button 1302, an example second selection button 1304, and an example third selection button 1306. As used herein, "selection button" refers to a user interface (UI) component that allows a user to select multiple options in a list includer several options. At operation 1308, the user 110 selects the first selection button 1302 to apply "Characteristic D1" to the secondary filter chip. As such, the user 110 adds another filter via the characteristic selection in the "More Filters" modal 1202.

Figure 14:
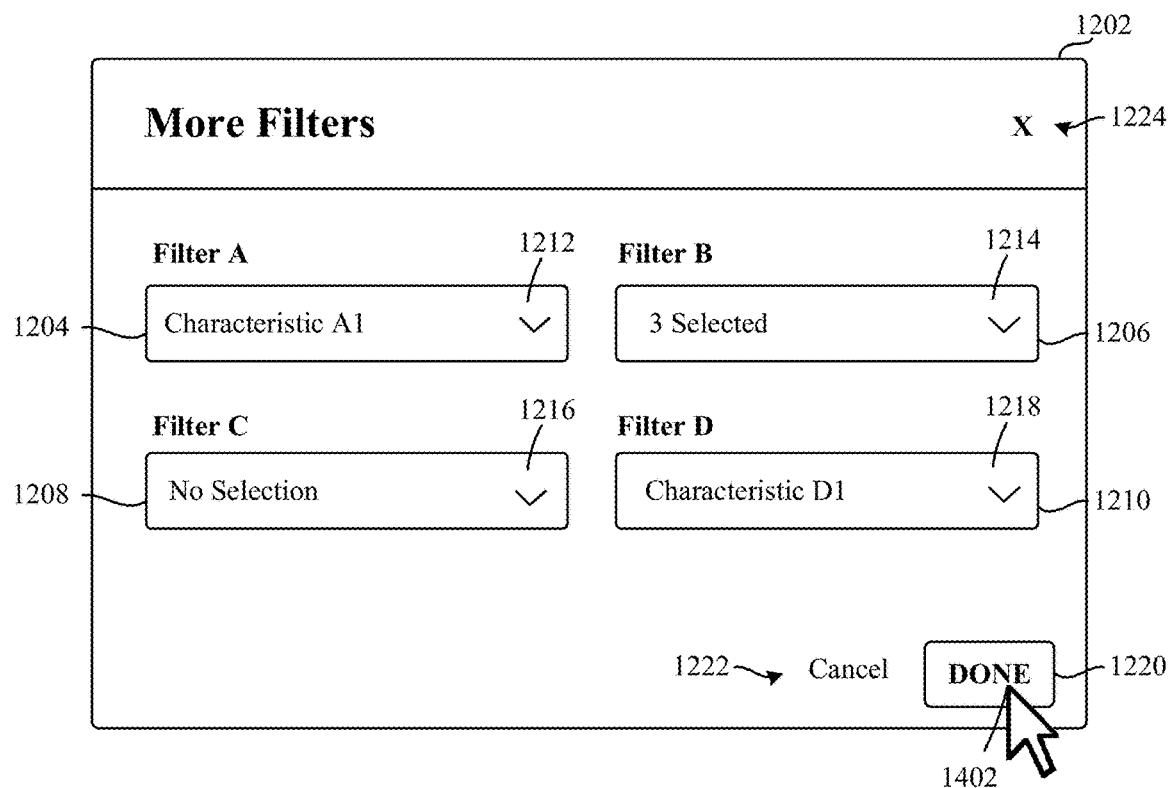

FIG. 14 is an illustration of interactions between the user 110 and the "More Filters" modal 1202. For example, at operation 1402, the user 110 selects the "Done" button 1220 to confirm the selections within the first dropdown menu 1204, the second dropdown menu 1206, the third dropdown menu 1208, and/or the fourth dropdown menu 1210.

Figure 15:
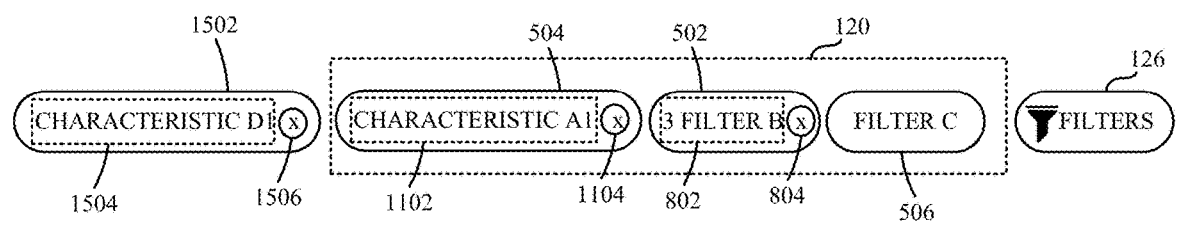

FIG. 15 is an illustration of the filter section 120 and the additional filters button 126 after the selection of a secondary first filter chip via the "More Filters" modal 1202. For example, after the user 110 selects the a characteristic from the fourth dropdown menu 1210, the filter display handler 204 renders an example fourth filter chip 1502 and indicates that the fourth filter chip 1502 (e.g., styles the fourth filter chip 1502) is active by highlighting the fourth filter chip 1502. Additionally, the filter display handler 204 sets an example textbox 1504 of the fourth filter chip 1502 according to the selected characteristic (e.g., "Characteristic D1"). Being that the fourth filter chip 1502 is now active, the fourth filter chip 1502 includes an example cancel button 1506 to allow the user 110 to deactivate the fourth filter chip 1502.

In the illustrated example of FIG. 15, after the filter display handler 204 indicates that the fourth filter chip 1502 is active and sets the textbox 1504 according to the selected characteristics, the filter display handler 204 orients the fourth filter chip 1502 as the first in the filter section 120. For example, the filter display handler 204 orders the first filter chip 502, the second filter chip 504, the third filter chip 506, and the fourth filter chip 1502 such that the most recently activated filter chip is arranged in the first position from the left in the array of filter chips (e.g., within the filter section 120). As such, the fourth filter chip 1502 extends outside the bounds of the filter section 120 (e.g., the first filter chip 502, the second filter chip 504, the third filter chip 506, and the fourth filter chip 1502 overflow and are clipped by the VC). Accordingly, the container size determination controller 208 determines that the LSE is less than the LVE with respect to the left side of the GUI 116.

Figure 16:
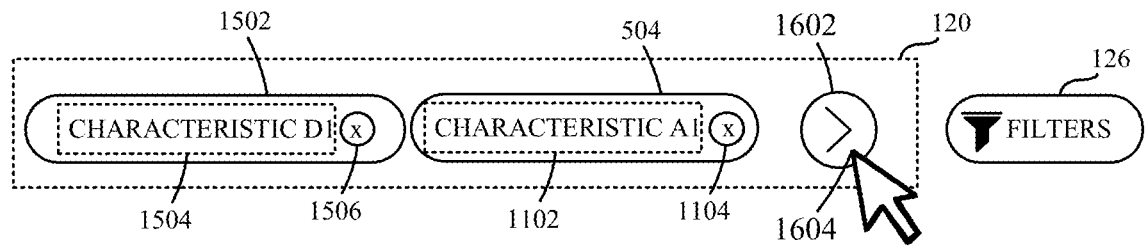

FIG. 16 is an illustration of a subsequent rendering of the filter section 120 after the user 110 adds the fourth filter chip 1502. As described above, the filter display handler 204 orients the fourth filter chip 1502 as the first in the filter section 120. Additionally, in response to the container size determination controller 208 determines that the LSE is less than the LVE with respect to the left side of the GUI 116, the filter display handler 204 renders an example right scroll toggle (RST) 1602 providing additional functionality to the user 110 to scroll through the primary filter chips and active secondary filter chips. In the example of FIG. 16, the filter display handler 204 renders the RST 1602 as a chevron button. The RST 1602 conveys to the user 110 that one or more filter chips (e.g., the first filter chip 502 and the third filter chip 506) overflow outside of the filter section 120 (e.g., the VC). At operation 1604, the user 110 selects the RST 1602 to scroll to the right.

Figure 17:
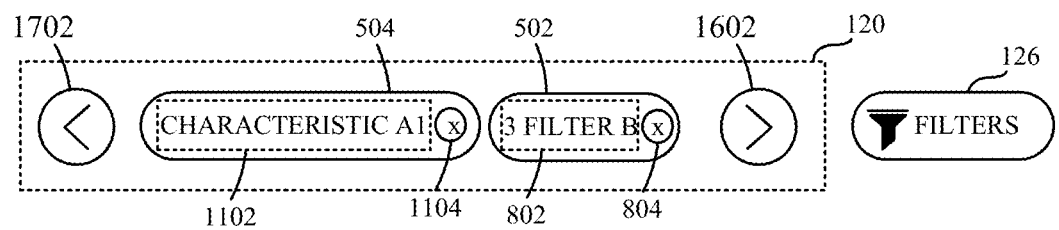

FIG. 17 is an illustration of a subsequent rendering of the filter section 120 after the operation 1604 of FIG. 16. Because the user 110 has scrolled to the right, the fourth filter chip 1502 overflows outside of the filter section 120 (e.g., to the left). Additionally, the third filter chip 506 also overflows outside of the filter section 120 (e.g., to the right). Accordingly, the container size determination controller 208 determines that the LSE is less than the LVE with respect to the left side of the GUI 116. Additionally, the container size determination controller 208 determines that the RVE is less than the RSE with respect to the left side of the GUI 116. In response to the container size determination controller 208 determines that the LSE is less than the LVE with respect to the left side of the GUI 116 and the RVE is less than the RSE with respect to the left side of the GUI 116, the filter display handler 204 renders the RST 1602 and an example left scroll trigger (LST) 1702 providing additional functionality to the user 110 to scroll through the primary filter chips and active secondary filter chips.

FIG. 18 is an illustration of an example view container (VC) 1802 and an example scroll container (SC) 1804. The example VC 1802 includes an example left view edge (LVE) 1806 and an example right view edge (RVE) 1808. The example SC 1804 includes an example left scroll edge (LSE) 1810 and an example right scroll edge (RSE) 1812. The LVE 1806 corresponds to a location of a left edge of the VC with respect to the left side of the GUI 116. The RVE 1808 corresponds to a location of a right edge of the VC with respect to the left side of the GUI 116. The LSE 1810 corresponds to a location of a left edge of the SC with respect to the left side of the GUI 116. The RSE 1812 corresponds to a location of a right edge of the SC with respect to the left side of the GUI 116.

FIG. 19 is an illustration of the VC 1802 and the SC 1804 including an example left scroll toggle (LST) 1902 and an example right scroll toggle (RST) 1904.

FIG. 20 is an illustration of example pseudo-code 2000 which may be used to implement the filter chip controller 130 of FIGS. 1 and/or 2. The pseudo-code 2000 includes example lines of code (LOC) 2002, 2004, 2006, and 2008. At LOC 2002, the filter chip controller 130 determines if the difference between the LSE and the LVE is less than zero. If so, the filter chip controller 130 displays the LST. At LOC 2004, the filter chip controller 130 determines if the difference between the LSE and the LVE is greater than or equal to zero. If so, the filter chip controller 130 does not display the LST. At LOC 2006, the filter chip controller 130 determines if the difference between the RVE and the RSE is less than zero. If so, the filter chip controller 130 displays the RST. At LOC 2008, the filter chip controller 130 determines if the difference between the RVE and the RSE is greater than or equal to zero. If so, the filter chip controller 130 does not display the RST.

Figure 21A:
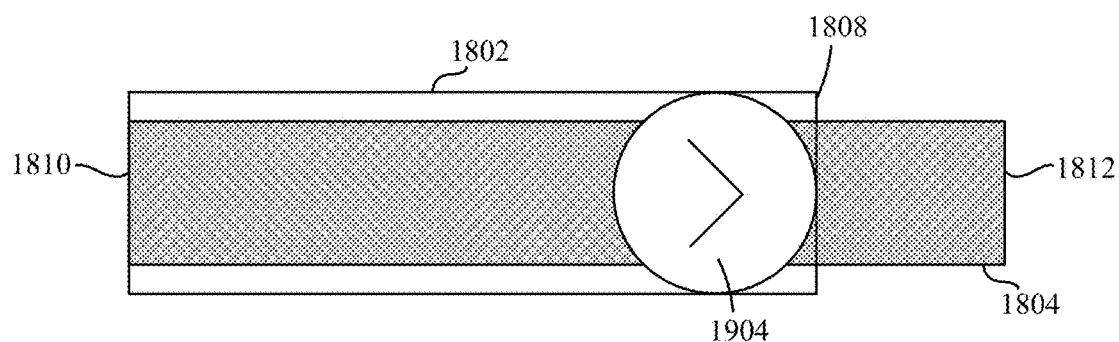
FIGS. 21A-21D are illustrations of operations of the filter chip controller of FIGS. 1 and/or 2 when displaying filter chips.

FIG. 21A is an illustration of an example operation of the filter chip controller 130 of FIGS. 1 and/or 2 when displaying filter chips. For example, because the RVE 1808 is less than the RSE 1812 with respect to the left side of the GUI 116, the filter display handler 204 renders the RST 1904. Additionally, because the LSE 1810 is not less than the LVE 1806 with respect to the left side of the GUI 116, the filter display handler 204 does not render the LST 1902.

Figure 21B:
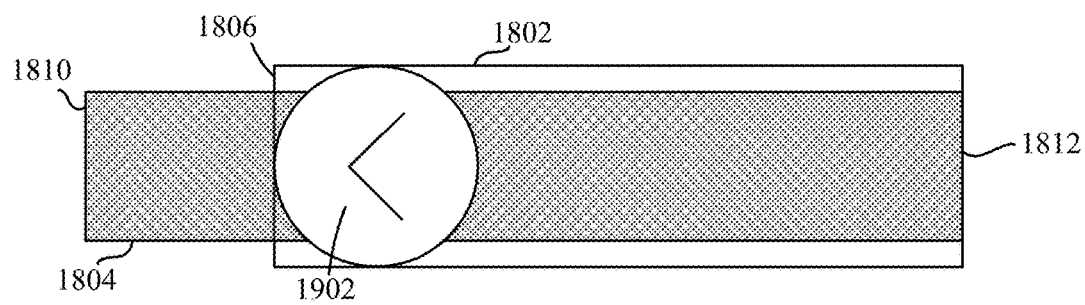

FIG. 21B is an illustration of an example operation of the filter chip controller 130 of FIGS. 1 and/or 2 when displaying filter chips. For example, because the RVE 1808 is not less than the RSE 1812 with respect to the left side of the GUI 116, the filter display handler 204 does not render the RST 1904. Additionally, because the LSE 1810 is less than the LVE 1806 with respect to the left side of the GUI 116, the filter display handler 204 renders the LST 1902.

Figure 21C:
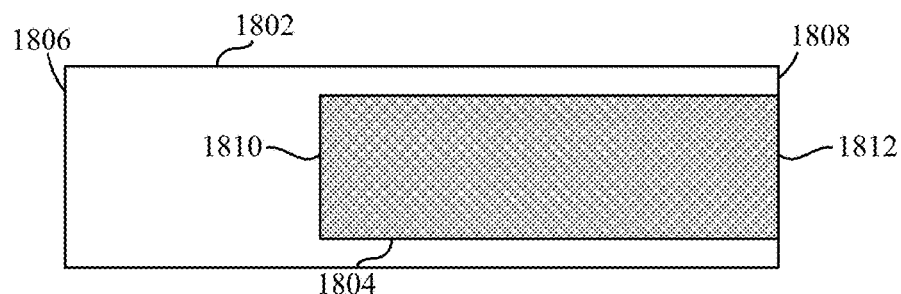

FIG. 21C is an illustration of an example operation of the filter chip controller 130 of FIGS. 1 and/or 2 when displaying filter chips. For example, because the RVE 1808 is not less than the RSE 1812 with respect to the left side of the GUI 116, the filter display handler 204 does not render the RST 1904. Additionally, because the LSE 1810 is not less than the LVE 1806 with respect to the left side of the GUI 116, the filter display handler 204 does not render the LST 1902.

Figure 21D:
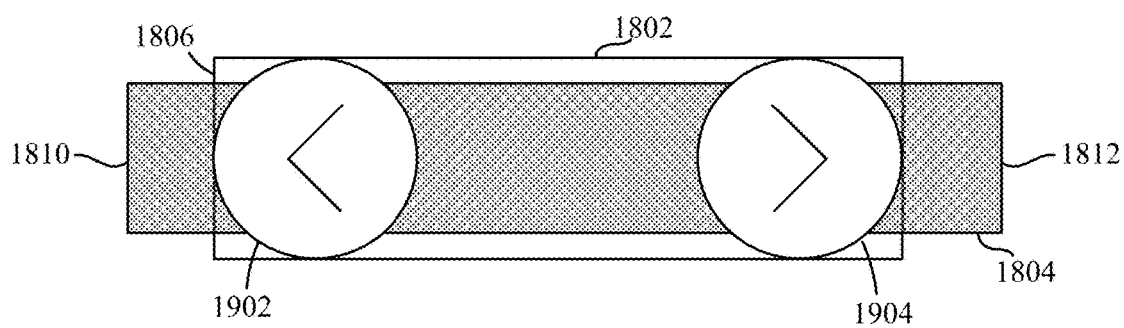

FIG. 21D is an illustration of an example operation of the filter chip controller 130 of FIGS. 1 and/or 2 when displaying filter chips. For example, because the RVE 1808 is less than the RSE 1812 with respect to the left side of the GUI 116, the filter display handler 204 renders the RST 1904. Additionally, because the LSE 1810 is less than the LVE 1806 with respect to the left side of the GUI 116, the filter display handler 204 renders the LST 1902.

Figure 22:
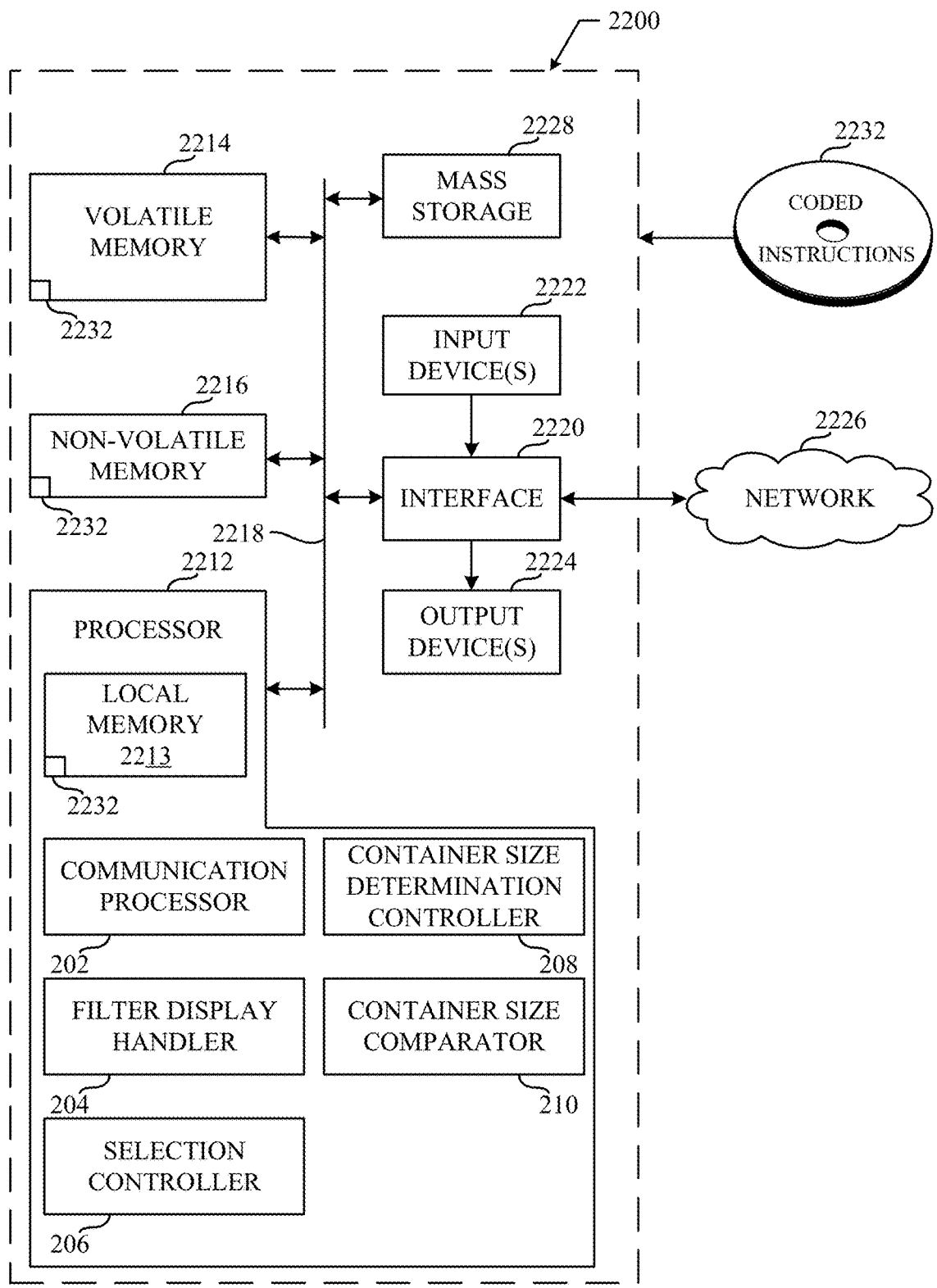
FIG. 22 is a block diagram of an example processing platform structured to execute the instructions of FIGS. 3 and/or 4 to implement the filter chip controller of FIGS. 1 and/or 2.

FIG. 22 is a block diagram of an example processor platform 2200 structured to execute the instructions of FIGS. 3 and/or 4 to implement the filter chip controller 130 of FIGS. 1 and/or 2. The processor platform 2200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 2200 of the illustrated example includes a processor 2212. The processor 2212 of the illustrated example is hardware. For example, the processor 2212 can be implemented by one or more integrated circuits, logic circuits, microprocessors, GPUs, DSPs, or controllers from any desired family or manufacturer. The hardware processor 2212 may be a semiconductor based (e.g., silicon based) device. In this example, the processor 2212 implements the example communication processor 202, the example filter display handler 204, the example selection controller 206, the example container size determination controller 208, and/or the example container size comparator 210.

The processor 2212 of the illustrated example includes a local memory 2213 (e.g., a cache). The processor 2212 of the illustrated example is in communication with a main memory including a volatile memory 2214 and a non-volatile memory 2216 via a bus 2218. The volatile memory 2214 may be implemented by Synchronous Dynamic Random-Access Memory (SDRAM), Dynamic Random-Access Memory (DRAM), RAMBUS® Dynamic Random-Access Memory (RDRAM®) and/or any other type of random-access memory device. The non-volatile memory 2216 may be implemented by flash memory and/or any other desired type of memory device. Access to the main memory 2214, 2216 is controlled by a memory controller.

The processor platform 2200 of the illustrated example also includes an interface circuit 2220. The interface circuit 2220 may be implemented by any type of interface standard, such as an Ethernet interface, a universal serial bus (USB), a Bluetooth® interface, a near field communication (NFC) interface, and/or a PCI express interface.

In the illustrated example, one or more input devices 2222 are connected to the interface circuit 2220. The input device(s) 2222 permit(s) a user to enter data and/or commands into the processor 2212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2224 are also connected to the interface circuit 2220 of the illustrated example. The output devices 2224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 2220 of the illustrated example, thus, typically includes a graphics driver card, a graphics driver chip, and/or a graphics driver processor.

The interface circuit 2220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2200 of the illustrated example also includes one or more mass storage devices 2228 for storing software and/or data. Examples of such mass storage devices 2228 include floppy disk drives, hard drive disks, compact disk drives, Blu-ray disk drives, redundant array of independent disks (RAID) systems, and digital versatile disk (DVD) drives.

The machine executable instructions 2232 of FIG. 22 implement the machine-readable instructions 300 of FIG. 3 and/or the machine-readable instructions 400 of FIG. 4 and may be stored in the mass storage device 2228, in the volatile memory 2214, in the non-volatile memory 2216, and/or on a removable non-transitory computer readable storage medium such as a CD or DVD.

Figure 23:
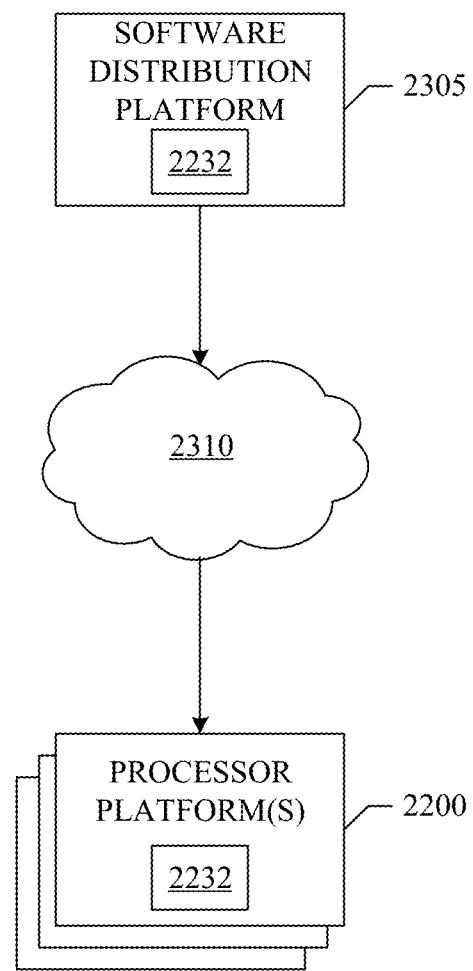
FIG. 23 is a block diagram of an example software distribution platform to distribute software (e.g., software corresponding to the example computer readable instructions of FIGS. 3 and/or 4) to client devices such as those owned and/or operated by consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 2305 to distribute software such as the example computer readable instructions 2232 of FIG. 22 to third parties is illustrated in FIG. 23. The example software distribution platform 2305 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 2232 of FIG. 22. The third parties may be consumers, users, retailers, OEMs, etc., who purchase and/or license the software for use and/or re-sale and/or sub-licensing. In the illustrated example, the software distribution platform 2305 includes one or more servers and one or more storage devices. The storage devices store the computer readable instructions 2232, which may correspond to the example computer readable instructions 300 of FIG. 3 and/or the example computer readable instructions 400 of FIG. 4, as described above. The one or more servers of the example software distribution platform 2305 are in communication with a network 2310, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 2232 from the software distribution platform 2305. For example, the software, which may correspond to the example computer readable instructions 2232 of FIG. 22, may be downloaded to the example processor platform 2200, which is to execute the computer readable instructions 2232 to implement the filter chip controller 130. In some example, one or more servers of the software distribution platform 2305 periodically offer, transmit, and/or force updates to the software (e.g., the example computer readable instructions 2232 of FIG. 22) to ensure improvements, patches, updates, etc. are distributed and applied to the software at the end user devices.

From the foregoing, it will be appreciated that example methods, apparatus and articles of manufacture have been disclosed that methods, apparatus, and articles of manufacture to display data in compact spaces. Examples disclosed herein a first HTML container (e.g., the VC) that renders a second HTML container (e.g., the SC) within the first HTML container. Examples disclosed herein measure the first HTML container and the second HTML container to determines if the content within the second HTML container (e.g., the SC) is larger than the first HTML container (e.g., the VC). If the content within the second HTML container is larger than the first HTML container, examples disclosed herein detect the size difference and renders one or more scroll toggles to the side and/or sides that has and/or have overflowing content. Advantageously, examples disclosed herein include filter chips that may be tailored to provide a user with increased control over which data is filtered from a pool of data.

The disclosed methods, apparatus and articles of manufacture improve the efficiency of using a computing device by allow a user to easily interact with many filter chips that have been applied to any view. For example, as space is limited on the display, the horizontal scroll bar disclosed herein allows a user to easily scroll through the filter chips that have been applied. If the user wants to modify a filter, examples disclosed herein provide the user with the functionality to modify the filter within the corresponding filter chip and/or easily clear the filter. Additionally, examples disclosed herein include a scroll bar including filter chips that can selectively display a left toggle, a right toggle, and/or both, and where the filter chips can be triggered to display a drop down lists, filtered check box options, radio buttons, and/or other graphical user interface control objects. Examples disclosed herein engage a user in an efficient and/or ergonomic manner that allows the user to execute more operations on a computer (e.g., to more efficiently use a computer). The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A non-transitory computer readable storage medium comprising instructions that, when executed, cause a processor to at least:
   render a view container and a scroll container included in a graphics user interface (GUI);
   in response to a left edge of the scroll container being closer to a left side of the GUI than a left edge of the view container, render a left scroll toggle actionable to scroll the scroll container left;
   determine first coordinates of a first pixel on a right edge of the view container with respect to the left side of the GUI to determine a first location of the right edge of the view container;
   determine second coordinates of a second pixel on a right edge of the scroll container with respect to the left side of the GUI to determine a second location of the right edge of the scroll container; and
   determine whether the first location of the right edge of the view container is less than the second location of the right edge of the scroll container to determine whether the right edge of the view container is closer to the left side of the GUI than the right edge of the scroll container; and
   in response to the right edge of the view container being closer to the left side of the GUI than the right edge of the scroll container, render a right scroll toggle actionable to scroll the scroll container right.

2. A non-transitory computer readable storage medium comprising instructions that, when executed, cause a processor to at least:
   render a view container and a scroll container included in a graphics user interface (GUI);
   determine first coordinates of a first pixel on a left edge of the scroll container with respect to a left side of the GUI to determine a first location of the left edge of the scroll container;
   determine second coordinates of a second pixel on a left edge of the view container with respect to the left side of the GUI to determine a second location of the left edge of the view container;
   determine whether the first location of the left edge of the scroll container is less than the second location of the left edge of the view container to determine whether the left edge of the scroll container is closer to the left side of the GUI than the left edge of the view container;
   in response to the left edge of the scroll container being closer to the left side of the GUI than the left edge of the view container, render a left scroll toggle actionable to scroll the scroll container left; and
   in response to a right edge of the view container being closer to the left side of the GUI than a right edge of the scroll container, render a right scroll toggle actionable to scroll the scroll container right.

3. The non-transitory computer readable storage medium of claim 2, wherein the instructions cause the processor to:
   in response to selection of the left scroll toggle, adjust rendering of the view container and the scroll container to display one or more filter chips included in the scroll container that are left of previously displayed filter chips; and
   in response to selection of the right scroll toggle, adjust rendering of the view container and the scroll container to display one or more filter chips included in the scroll container that are right of previously displayed filter chips.

4. The non-transitory computer readable storage medium of claim 1, wherein the scroll container includes one or more filter chips that are configured to be selected to alter characteristics by which data is filtered based on respective ones of the filter chips.

5. The non-transitory computer readable storage medium of claim 4, wherein the data is related to an agricultural application.

6. The non-transitory computer readable storage medium of claim 1, wherein the instructions cause the processor to:
   in response to selection of the left scroll toggle, adjust rendering of the view container and the scroll container to display one or more filter chips included in the scroll container that are left of previously displayed filter chips; and
   in response to selection of the right scroll toggle, adjust rendering of the view container and the scroll container to display one or more filter chips included in the scroll container that are right of previously displayed filter chips.

7. The non-transitory computer readable storage medium of claim 1, wherein the instructions cause the processor to render the left scroll toggle and the right scroll toggle such that a first height of the left scroll toggle and a second height of the right scroll toggle is based on a third height of the view container.

8. An apparatus comprising:
one or more storage devices; and
processor circuitry to execute:
   container size determination controlling instructions to:
      determine first coordinates of a first pixel on a right edge of a view container with respect to a left side of a graphics user interface (GUI) to determine a first location of the right edge of the view container; and
      determine second coordinates of a second pixel on a right edge of a scroll container with respect to the left side of the GUI to determine a second location of the right edge of the scroll container;
   container size comparing instructions to:
      determine whether a third location of a left edge of the scroll container is less than a fourth location of a left edge of the view container; and
      determine whether the first location of the right edge of the view container is less than the second location of the right edge of the scroll container; and
   filter display handling instructions to:
      render the view container and the scroll container included in the GUI;
      in response to the left edge of the scroll container being closer to the left side of the GUI than the left edge of the view container, render a left scroll toggle actionable to scroll the scroll container left; and
      in response to the right edge of the view container being closer to the left side of the GUI than the right edge of the scroll container, render a right scroll toggle actionable to scroll the scroll container right.

9. An apparatus comprising:
one or more storage devices; and
processor circuitry to execute:
   container size determination control instructions to:
      determine first coordinates of a first pixel on a left edge of a scroll container with respect to a left side of a graphics user interface (GUI) determine a first location of the left edge of the scroll container; and
      determine second coordinates of a second pixel on a left edge of a view container with respect to the left side of the GUI to determine a second location of the left edge of the view container;
   container size comparing instructions to:
      determine whether the first location of the left edge of the scroll container is less than the second location of the left edge of the view container; and
      determine whether a third location of a right edge of the view container is less than a fourth location of a right edge of the scroll container; and
   filter display handling instructions to:
      render the view container and the scroll container included in the GUI;
      in response to the left edge of the scroll container being closer to the left side of the GUI than the left edge of the view container, render a left scroll toggle actionable to scroll the scroll container left; and
      in response to the right edge of the view container being closer to the left side of the GUI than the right edge of the scroll container, render a right scroll toggle actionable to scroll the scroll container right.

10. The apparatus of claim 9, wherein the processor circuitry is to execute the filter display handling instructions to:

in response to selection of the left scroll toggle, adjust rendering of the view container and the scroll container to display one or more filter chips included in the scroll container that are left of previously displayed filter chips; and in response to selection of the right scroll toggle, adjust rendering of the view container and the scroll container to display one or more filter chips included in the scroll container that are right of previously displayed filter chips.

11. The apparatus of claim 8, wherein the scroll container includes one or more filter chips that are configured to be selected to alter characteristics by which data is filtered based on respective ones of the filter chips.

12. The apparatus of claim 11, wherein the data is related to an agricultural application.

13. The apparatus of claim 8, wherein the processor circuitry is to execute the filter display handling instructions to:
in response to selection of the left scroll toggle, adjust rendering of the view container and the scroll container to display one or more filter chips included in the scroll container that are left of previously displayed filter chips; and
in response to selection of the right scroll toggle, adjust rendering of the view container and the scroll container to display one or more filter chips included in the scroll container that are right of previously displayed filter chips.

14. The apparatus of claim 8, wherein the processor circuitry is to execute the filter display handling instructions to render the left scroll toggle and the right scroll toggle such that a first height of the left scroll toggle and a second height of the right scroll toggle is based on a third height of the view container.

15. A method comprising:
rendering a view container and a scroll container included in a graphics user interface (GUI);
in response to a left edge of the scroll container being closer to a left side of the GUI than a left edge of the view container, rendering a left scroll toggle actionable to scroll the scroll container left;
determining first coordinates of a first pixel on a right edge of the view container with respect to the left side of the GUI to determine a first location of the right edge of the view container;
determining second coordinates of a second pixel on a right edge of the scroll container with respect to the left side of the GUI to determine a second location of the right edge of the scroll container;
determining whether the first location of the right edge of the view container is less than the second location of the right edge of the scroll container to determine whether the right edge of the view container is closer to the left side of the GUI than the right edge of the scroll container; and
in response to the right edge of the view container being closer to the left side of the GUI than the right edge of the scroll container, rendering a right scroll toggle actionable to scroll the scroll container right.

16. A method comprising:
rendering a view container and a scroll container included in a graphics user interface (GUI);
determining first coordinates of a first pixel on a left edge of the scroll container with respect to a left side of the GUI to determine a first location of the left edge of the scroll container;
determining second coordinates of a second pixel on a left edge of the view container with respect to the left side of the GUI to determine a second location of the left edge of the view container; and
determining whether the first location of the left edge of the scroll container is less than the second location of the left edge of the view container to determine whether the left edge of the scroll container is closer to the left side of the GUI than the left edge of the view container;
in response to the left edge of the scroll container being closer to the left side of the GUI than the left edge of the view container, rendering a left scroll toggle actionable to scroll the scroll container left; and
in response to a right edge of the view container being closer to the left side of the GUI than a right edge of the scroll container, rendering a right scroll toggle actionable to scroll the scroll container right.

17. The method of claim 16, further including:
in response to selection of the left scroll toggle, adjusting rendering of the view container and the scroll container to display one or more filter chips included in the scroll container that are left of previously displayed filter chips; and
in response to selection of the right scroll toggle, adjusting rendering of the view container and the scroll container to display one or more filter chips included in the scroll container that are right of previously displayed filter chips.

18. The method of claim 15, wherein the scroll container includes one or more filter chips that are configured to be selected to alter characteristics by which data is filtered based on respective ones of the filter chips.

19. The method of claim 18, wherein the data is related to an agricultural application.

20. The method of claim 15, further including:
in response to selection of the left scroll toggle, adjusting rendering of the view container and the scroll container to display one or more filter chips included in the scroll container that are left of previously displayed filter chips; and
in response to selection of the right scroll toggle, adjusting rendering of the view container and the scroll container to display one or more filter chips included in the scroll container that are right of previously displayed filter chips.

* * * * *